US012553420B2

(12) United States Patent
Ordutowski

(10) Patent No.: US 12,553,420 B2
(45) Date of Patent: Feb. 17, 2026

(54) VEHICLE PROPULSION UNIT AND THE MANNER OF ITS OPERATION

(71) Applicant: Radoslaw Ordutowski, Szczecin (PL)

(72) Inventor: Radoslaw Ordutowski, Szczecin (PL)

( * ) Notice: Subject to any disclaimer, the term of this patent is extended or adjusted under 35 U.S.C. 154(b) by 47 days.

(21) Appl. No.: 17/786,536

(22) PCT Filed: Dec. 16, 2020

(86) PCT No.: PCT/PL2020/000095
§ 371 (c)(1),
(2) Date: Jun. 17, 2022

(87) PCT Pub. No.: WO2021/125985
PCT Pub. Date: Jun. 24, 2021

(65) Prior Publication Data
US 2023/0031448 A1    Feb. 2, 2023

(30) Foreign Application Priority Data
Dec. 17, 2019   (PL) .......................................... 432266

(51) Int. Cl.
*F03G 7/10*    (2006.01)
(52) U.S. Cl.
CPC ................... *F03G 7/125* (2021.08)
(58) Field of Classification Search
CPC ...................................... F03G 7/125
USPC ......................................... 74/84 S
See application file for complete search history.

(56) References Cited

U.S. PATENT DOCUMENTS

| 2,886,976 | A |   | 5/1959  | Dean |
|---|---|---|---|---|
| 3,266,233 | A |   | 8/1966  | Farrall |
| 3,555,915 | A |   | 1/1971  | Young, Jr. |
| 3,625,089 | A |   | 12/1971 | Rutkove |
| 3,863,510 | A |   | 2/1975  | Benson |
| 4,631,971 | A | * | 12/1986 | Thornson .................. F03G 3/00 180/7.1 |
| 6,347,766 | B1 |   | 2/2002  | Woodward |
| 6,960,975 | B1 |   | 11/2005 | Volfson |

(Continued)

FOREIGN PATENT DOCUMENTS

| CN | 102777336 A | * | 11/2012 |
|---|---|---|---|
| CN | 105781921 B1 |   | 7/2016 |

(Continued)

OTHER PUBLICATIONS

Machine translation of CN-102777336-A (Year: 2012).*

*Primary Examiner* — Randell J Krug
(74) *Attorney, Agent, or Firm* — Andrzej Malarz, Esq.

(57) ABSTRACT

A method of operation and a propulsion unit for vehicles, where the movement of the propulsion unit comprising at least two modules, each consisting of a frame (1) and fixing beams (3*a*) and (3*b*) and provided with controllers (9*a*), (9*b*) and (10*a*), (10*b*) for work motors (5*a*), (5*b*) and (6*a*), (6*b*), at the ends of which are placed load elements (7*a*), (7*b*) and (8*a*), (8*b*) preferably with a mass of more than 1% of the mass of the module, and torque generating base motors (2*a*) and (2*b*), provided with controllers (4*a*) and (4*b*) and a power source (11) preferably at least 5 V and an electronic system (12) for controlling the rotation and the sequence of starting of the base motors (2*a*) and (2*b*) and the work motors (5*a*), (5*b*) and (6*a*), (6*b*), is implemented by controlling the position and movement of the load elements.

22 Claims, 26 Drawing Sheets

(56) References Cited

U.S. PATENT DOCUMENTS

Figure 1:
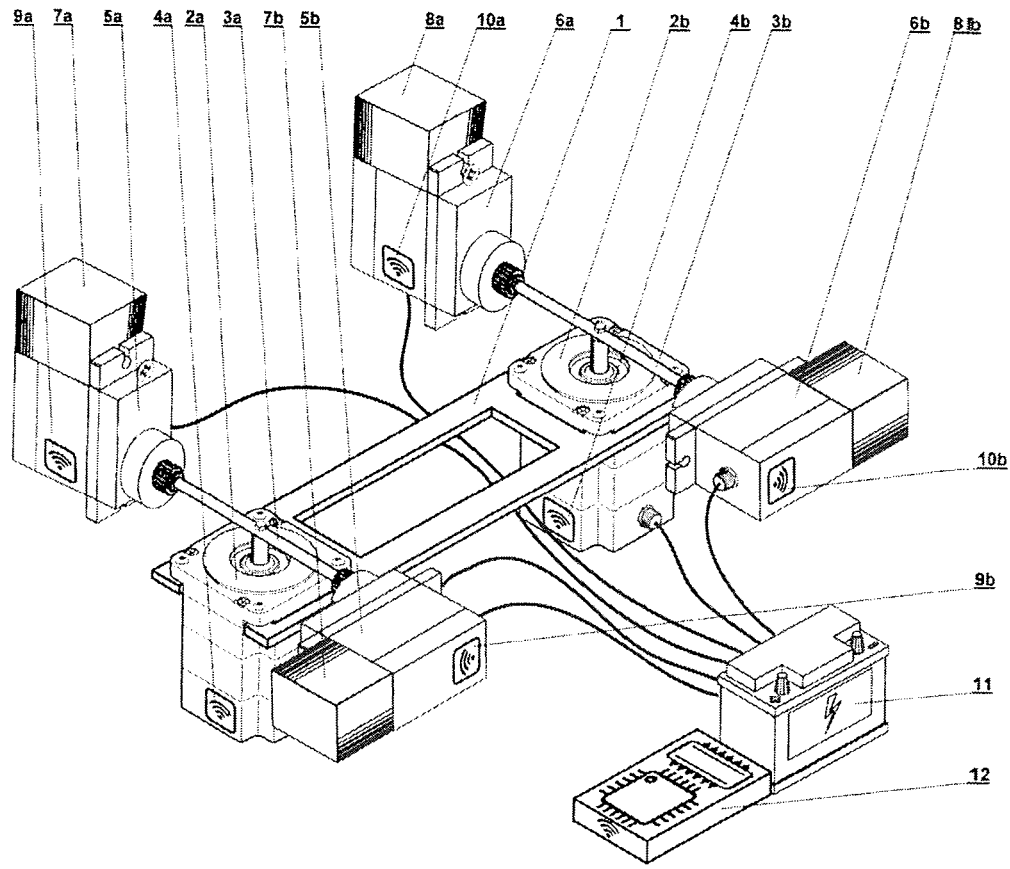

| | | | |
|---|---|---|---|
| 8,066,226 B2* | 11/2011 | Fiala | B64G 1/409 244/165 |
| 9,199,746 B2* | 12/2015 | Nagabhushan | B64G 1/286 |
| 10,144,532 B2 | 12/2018 | Pais | |
| 2001/0032522 A1* | 10/2001 | Davis, Jr. | F03G 7/115 74/84 S |
| 2003/0209637 A1 | 11/2003 | St. Clair | |
| 2004/0250636 A1* | 12/2004 | Macphail | F03G 3/08 74/5.1 |
| 2009/0108136 A1* | 4/2009 | Suzuki | F03G 7/125 74/5.37 |
| 2021/0324837 A1* | 10/2021 | Abers | F03G 7/125 |

FOREIGN PATENT DOCUMENTS

| | | |
|---|---|---|
| CN | 105947224 B | 9/2016 |
| GB | 2537119 A | 10/2016 |
| KR | 20020092863 A | 12/2002 |
| WO | 1998004857 A1 | 2/1998 |

* cited by examiner

VEHICLE PROPULSION UNIT AND THE MANNER OF ITS OPERATION

The object of the invention is a propulsion unit and method of operation thereof for vehicles of any type, such as automobiles, aircraft, boats, space ships and shuttles, as well as smaller objects using any type of propulsion, such as space probes.

Today, fuels used to power all kinds of vehicles are a major problem. This is due to the limitation of transport capacity, especially in spacecraft, range, amount of natural resources and also for environmental reasons, where pollution is an issue. This is why different types of fuel have been sought for years, and hybrid and electric drives are becoming increasingly popular. However, with the traditional approach there is always the problem of being able to travel long distances, to supply the energy needed to move the vehicles. Not to mention the cost.

Alternative propulsion units have therefore been developed for many years to overcome these problems.

The collection of patent literature describes many propulsion designs developed using inertial force or gravitational force. However, the inventors describe the operation of these devices in general terms, without evidence or calculations, so that analysis of these patent documents often leads to the conclusion that it is not possible to build devices according to the invention that work as the inventors would like. The most common impression is that these devices do not fulfil the basic principles of physics, in particular Newton's third law or the principle of conservation of momentum.

Known from U.S. Pat. No. 2,886,976, a propulsion system includes a freely suspended rotating inertia mass which, by appropriately limiting the degrees of freedom of movement, produces an oscillatory motion of the system at a predetermined frequency and amplitude, said propulsion system periodically transmitting unidirectional pulses to a load device without causing a response to the frequency and amplitude of the oscillation of the system, said oscillation of the system being maintained at a predetermined frequency and amplitude by pairs of freely suspended inertia masses rotating at the same speed but in opposite directions about parallel axes relative to which they are eccentrically mounted, the said system supplying cyclic and unidirectional energy to the load system during one phase of each oscillation, the said system being cyclically displaced by external forces after each pulse during a specified phase of the oscillation during which the resistance of the system against displacement is minimal.

Known from patent description U.S. Pat. No. 6,347,766, the device includes a rotary actuator having a motor that drives both a rotary output shaft coupled to the load and an effective rotating mass including an inertia wheel rotating on an axis parallel to the output shaft. This wheel rotates in the direction opposite to the output shaft, the mass of the inertia wheel and its rotational speed relative to the rotational speed of the output shaft being such that, when coupled to the load, the total angular momentum of the wheel and other rotating parts that rotate in the same direction as the wheel is equal to the total angular momentum of the load and other rotating parts that rotate in the same direction as the load. By rotating simultaneously in opposite directions, the load, inertia wheel and other rotating parts produce equal, but opposite, inertial reaction moments on the actuator housing. Accordingly, the inertial reaction moments on the actuator housing, and therefore on any support structure attached to the housing, are in equilibrium so that there is no tendency for such housing or structure to rotate during changes in load speed. According to the developer, the inertia wheel rotates faster than the load, thus enabling the weight of the inertia wheel to be minimised while maintaining the balance of the reaction moment of inertia in the actuator.

A device known from patent description U.S. Pat. No. 3,266,233 generates a force on a supported body, wherein to provide a reactive force pulsation on the supported body to produce serial pulses in a desired direction, a series of reactive forces must be applied in series to the supported body to provide movement in the desired direction, while energy is stored between the two bodies and released between the two bodies when one body is released to move the other body in the opposite direction and the energy applied to the released body provides propulsion.

Patent description No. U.S. Pat. No. 3,555,915 discloses a directional force generator comprising a mechanism that uses centrifugal and rotational action to move a wheeled vehicle, boat or aircraft on which the generator is mounted in a predetermined direction without other means of propulsion or lifting. The pendulum shafts rotate pivotally about the rotating main shaft, each pendulum shaft having at its outer end a head having one or more pivotally mounted weighted movable arms independent of each other. When the head is simultaneously rotated, by a pivoting shaft around the swing axis, the shaft able to move and moving around the main shaft, due to centrifugal and gyroscopic forces, act so that the pivotally mounted arms come out of an angularly balanced plane of rotation. The directional force, which resists the movement of the rotating arms beyond their balanced plane of rotation, causes the generator and the mechanism on which the system is mounted to move in predetermined directions, depending on the direction of rotation of the shafts and heads.

Patent description No. U.S. Pat. No. 3,625,089 describes a device having a rotating cylindrical wheel mounted on a shaft. The wheel has many diametrically arranged moving arms. Load bearing feet are placed on opposite ends of the spokes. The electric motor is coupled to the shaft via a slipping clutch. The spokes are spaced axially along the wheel and are also arranged circumferentially. An inclined platform is provided to raise the spokes. When the spokes are fully raised, balanced and rotating by gravity, the wheel spins at high speed and drives the central shaft which is coupled to the rotating load. The thirty-two or more spokes used ensure that the wheel rotates evenly. Rolling bearings are located on the inclined platform and in the load bearing feet at the ends of the spokes and facilitate axial movement of the spokes.

Known from patent description no. U.S. Pat. No. 3,863,510, an inertia motor includes a motor-driven propulsion shaft supporting a coaxially mounted piston rod that is rotatable and can move axially along the propulsion shaft. A pair of balanced weights is also rotated with the propulsion shaft on a pair of toothed segments coupled by pinions mounted on the piston rod, so that the axial movement of the piston rod draws the weights inwards towards the propulsion shaft in an arc parallel to the axis of the propulsion shaft. The piston rod is then released, causing the weights to be moved outwards by centrifugal force in an arc. This creates a thrust element that causes the vehicle on which the inertia motor is mounted to move.

Known from patent description no. WO1998004851, the device is used by vehicles driven, braked and controlled by means of an inertial propulsion. It consists of a "power phase" to move the weight in the vehicle, alternating with a "zero phase" to cancel the return phase or the impact reaction. This process is feasible by selectively applying a pure external force and opposing the movement of the weight in the power phase.

Patent application No. US20030209637 discloses a spacecraft propulsion system utilizing thrusters comprising an engine-driven structure comprising an electrostatically charged cylinder rotating in an electrostatically charged ring to generate space-time tension-energy tension-energy in a horizontal direction. The thrusters are assisted by magnetic vortex generators, either embedded in cylinders or placed above each thruster, to increase the permeability of space by infusing each thruster with the energy of the low-density hyperspace generated by the space-time tunnel created between our space and hyperspace. A combination of three jet engines mounted on the lower part of the spacecraft's hull provides thrust and yaw control.

Known from U.S. Patent Description No. U.S. Pat. No. 6,960,975, the spacecraft is propelled by the pressure of an inflationary vacuum state, wherein the propulsion system includes a hollow superconducting disc, an inner disc, an energy source, a support structure, upper and lower means for generating an electromagnetic field and a flux modulation controller. The cooled hollow superconducting disc is energised by the electromagnetic field, causing the quantised net ion vortices to create a gravitomagnetic field that creates an anomalous curvature of space-time outside the spacecraft. The imbalance of the curvature of space-time, with the curvature of space-time being the same as gravity, provides propulsion for the spacecraft. The spacecraft, surrounded by a space-time anomaly, can travel at close to the speed of light.

English patent description No. GB2537119 discloses a device, an essential part of which is a microwave resonator enclosing microwave radiation delivered by a magnetron. One end of the resonator is wider than the other and is sized to provide resonance for electromagnetic waves of a specific length. In this way the waves propagating towards the wider end are supposed to accelerate, while towards the narrower end they slow down. As a result of the different speeds of travel, the wave fronts are expected to exert different radiation pressures on the opposite ends of the resonator, thus creating a non-zero thrust moving the vessel Known from U.S. Patent Description No. U.S. Pat. No. 10,144,532, the propulsion element comprises an inner wall of a resonance cavity, an outer resonance cavity and microwave emitters. The electrically charged outer wall of the resonance cavity and the electrically insulated inner wall of the resonance cavity form a resonance cavity. Microwave emitters produce high-frequency electromagnetic waves throughout the resonance cavity, causing the resonance cavity to vibrate in an accelerated mode and produce a localised polarised vacuum outside the outer wall of the resonance cavity.

Chinese patent description No. CN105781921 discloses an electromagnetic thruster chamber based on a periodic microwave structure formed by coating an electrically conductive layer on the surface of an electrically conductive metal or non-metallic material, which is locally mounted in a conventional resonance cavity so that the electromagnetic waves are distributed in the resonance cavity in an unbalanced manner to produce directed radiation pressure in a specific direction to generate thrust, whereby the mass of the spacecraft propulsion system can be effectively reduced and the life of the spacecraft is extended.

Chinese patent description No. CN105947224 discloses a system and method for an electromagnetic propulsion comprising an amplifier module, an electromagnetic propulsion module and a feedback power control module. The signal source provides the trigger signal and sends the signal to the input control module. The input control module receives the trigger signal sent from the signal source and the feedback signal sent from the feedback power control module and sends the signals to the filter module. The filter module filters the trigger signal and feedback signal and sends the signals to the microwave amplifier module. The microwave amplifier module amplifies signals and sends signals to the electromagnetic propulsion module. The electromagnetic propulsion module converts the input power into thrust. The power of the feedback signal is matched to the input power of the microwave amplifier module.

The purpose of the invention is to construct a device in the form of a propulsion unit, consisting of load elements and motors causing a change in the position of the load elements, so that the resultant force generated inside the device, resulting from mutual positions and movements of the load elements, causes the device to move.

The vehicle propulsion unit according to the invention comprises at least two modules connected by a frame 1, where each module comprises work motors 5a, 5b and 6a, 6b mounted on mounting beams 3a and 3b and provided with controllers 9a, 9b and 10a, 10b, at the ends of which are placed load elements 7a, 7b and 8a, 8b with a mass preferably representing more than 1% of the mass of the module, and momentum-generating base motors 2a and 2b, provided with controllers 4a and 4b and a power source 11 with a voltage preferably of at least 5 V and an electronic system 12 for controlling the rotation and starting sequence of base motors 2a and 2b and work motors 5a, 5b and 6a, 6b. Base and work motors can be either electric motors or servos powered by DC or AC, or a combination of these. In principle, there is no limitation on the power of the motors, but for the purposes of this application a power of preferably not less than 1 mW is assumed, the physical parameters of the base or work motors being, respectively, the same. The communication between the propulsion components can also be either wireless, wired or mixed. An important feature of the propulsion is that the load elements 7a, 7b and 8a, 8b have substantially equal masses and can be made of any material of the type metal, plastic, other organic materials. In a particular case, the function of the load elements is fulfilled by the work motors 5a, 5b, 6a, 6b, or by the accumulators of electricity supplying these work motors.

The propulsion unit according to the invention may operate according to 2 diagrams, differing in the starting position, where the position of the fixing beams 3a and 3b is either in a parallel position with respect to the axis of symmetry O3, or in a perpendicular position.

The method of operation of the propulsion unit according to the invention according to the first diagram is characterized by the fact that the movement of the propulsion unit comprising at least two modules is realized by controlling the position and movement of the load elements 7a, 7b and 8a, 8b in 3 positions: start, central and end positions, whereby in order to obtain the start position, the base motors 2a and 2b, under the influence of control impulses, rotate the fixing beams 3a and 3b so that they obtain a position parallel to the axis of symmetry O3 of the mounting frame 1, the work motors 5a, 5b and 6a, 6b position load elements 7a and 8a perpendicular to the plane of rotation of the beams 3a and 3b, and position load elements 7b and 8b parallel to the plane of rotation of the beams 3a and 3b, and then, in the first phase of movement, the beams 3a and 3b are simultaneously rotated by the base motors 2a and 2b in opposite directions by an angle of 180°, which causes the movement of the propulsion unit by the vector W5 along the axis of symmetry O3 of the mounting frame 1 under the influence of the resultant force F1 resulting from the movement of the load elements 7a, 7b and 8a, 8b, which gives the central position, and then, in the second phase of the movement, the work motors 5a, 5b and 6a, 6b change the position of the load elements 7a, 7b and 8a, 8b by an angle of 90°, so that load elements 7a and 8a lying perpendicular to the plane of rotation of the beams 3a and 3b are brought to a position parallel to this plane of rotation, and load elements 7b and 8b lying parallel to the plane of rotation of the beams 3a and 3b are brought to a position perpendicular to this plane of rotation, thus providing an end position coinciding with the start position.

The method of operation of the propulsion unit according to the invention according to diagram two is characterized in that the movement of the propulsion unit comprising at least two modules is realized by controlling the position and movement of the load elements 7a, 7b and 8a, 8b in 3 positions: start, central and end position, wherein in order to obtain the start position the base motors 2a and 2b under the influence of control impulses rotate the fixing beams 3a and 3b so that they obtain a position perpendicular to the axis of symmetry O3 of the mounting frame 1, the work motors 5a, 5b and 6a, 6b position the load elements 7a and 8a perpendicular to the plane of rotation of the beams 3a and 3b, and the load elements 7b and 8b parallel to the plane of rotation of the beams 3a and 3b, and then, in the first phase of movement, beams 3a and 3b are simultaneously rotated by means of base motors 2a and 2b in opposite directions by an angle of 180°, which causes movement of the propulsion unit by the difference of lengths of vectors W7 and W8 along the axis of symmetry O3 of the mounting frame 1 under the influence of the resultant force F1 resulting from the movement of load elements 7a, 7b and 8a, 8b, resulting in the central position, and then, in the second phase of the movement, the motors 5a, 5b and 6a, 6b change the position of the load elements 7a, 7b and 8a, 8b by an angle of 90° so that the load elements 7a and 8a lying perpendicular to the plane of rotation of the beams 3a and 3b are brought to a position parallel to this plane of rotation, and the load elements 7b and 8b lying parallel to the plane of rotation of the beams 3a and 3b are arranged in a position perpendicular to this plane of rotation, which causes the propulsion unit to move by the vector W10 along the axis of symmetry O3 of the mounting frame 1 under the influence of the resultant force F4 resulting from the movement of the load elements 7a, 7b and 8a, 8b, resulting in an end position coinciding with the start position.

Figure 3A:
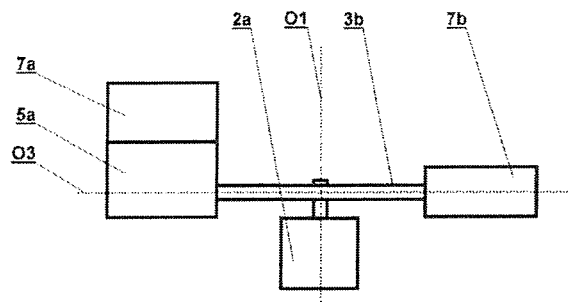
Figure 3B:
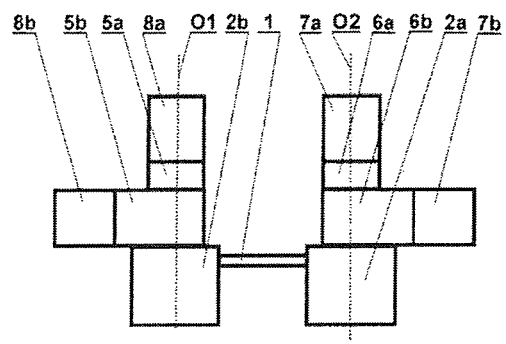
Figure 3C:
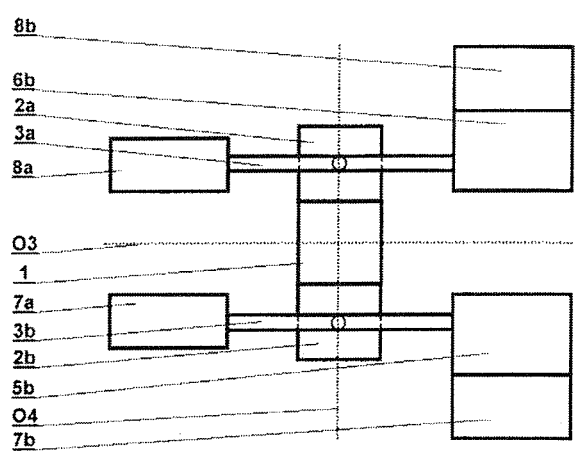
Figure 4:
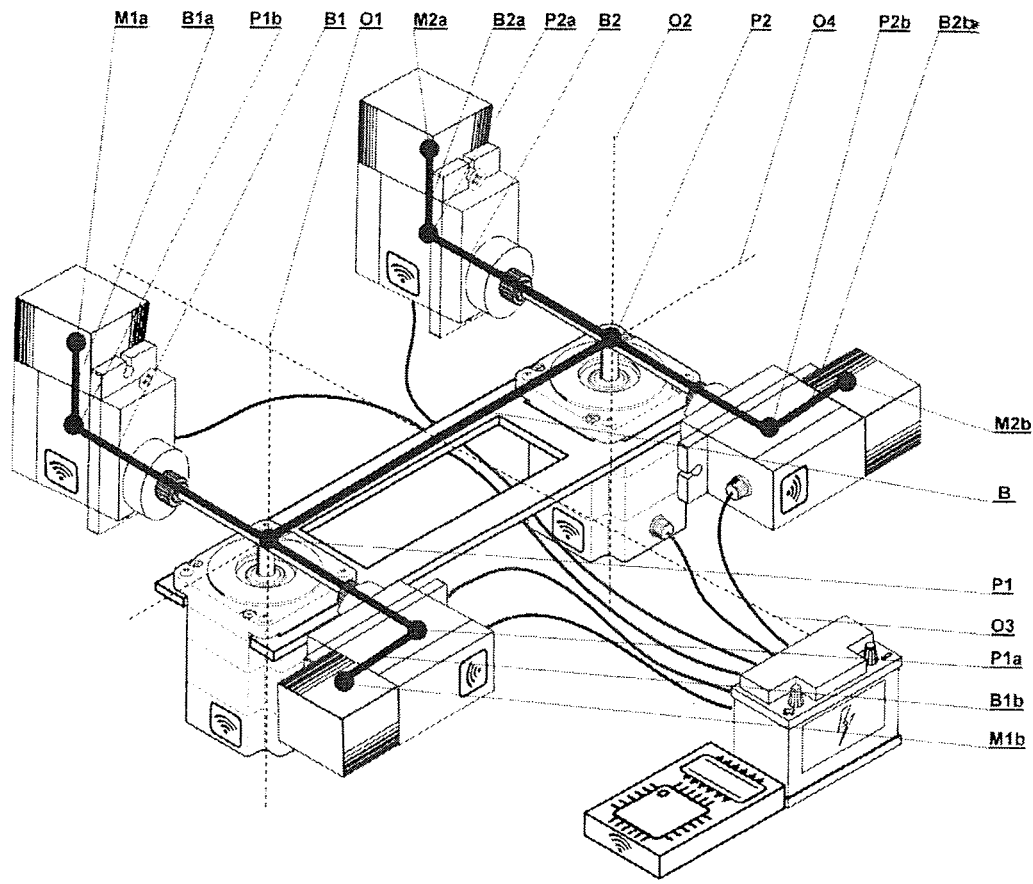

The device according to the invention is illustrated in examples of implementation essentially in FIGS. 1 and 4, while FIG. 2, 3, 5-46 explain how the propulsion works, and FIG. 47-50—examples of application.

Due to the innovative approach of the developers to the problem to be solved, the principle of operation of the propulsion is explained by means of individual drawings.

Figure 2:
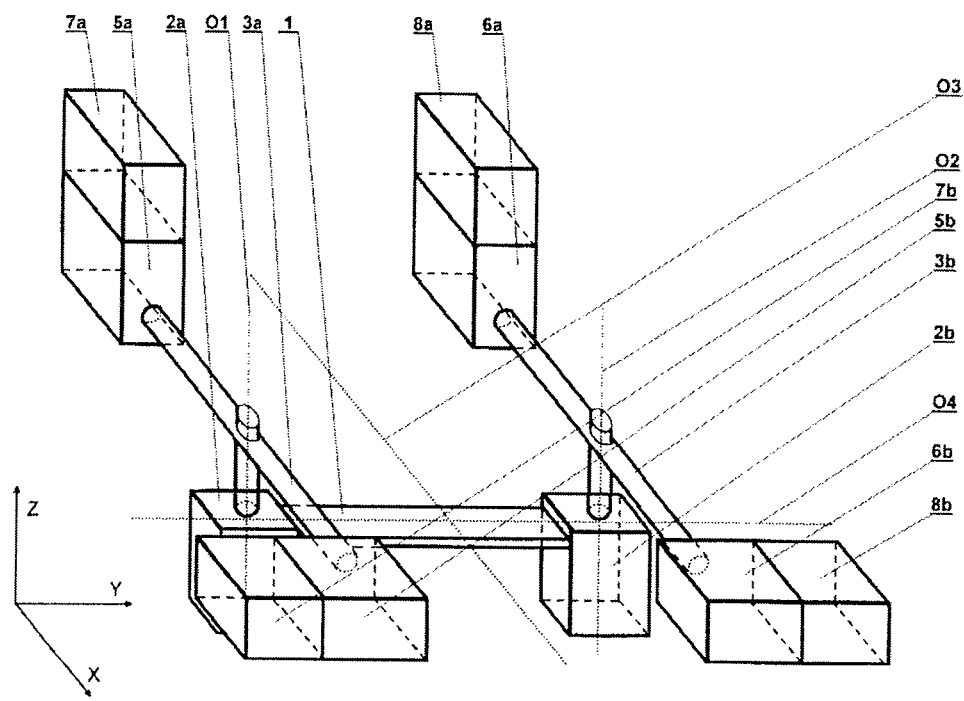
Figure 5:
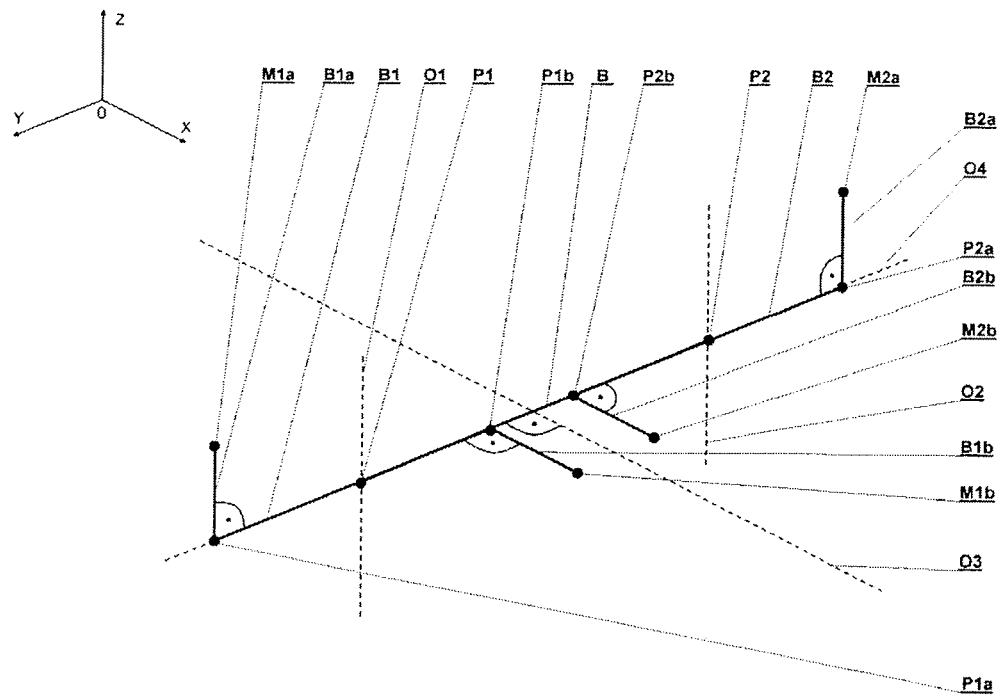
Figure 6:
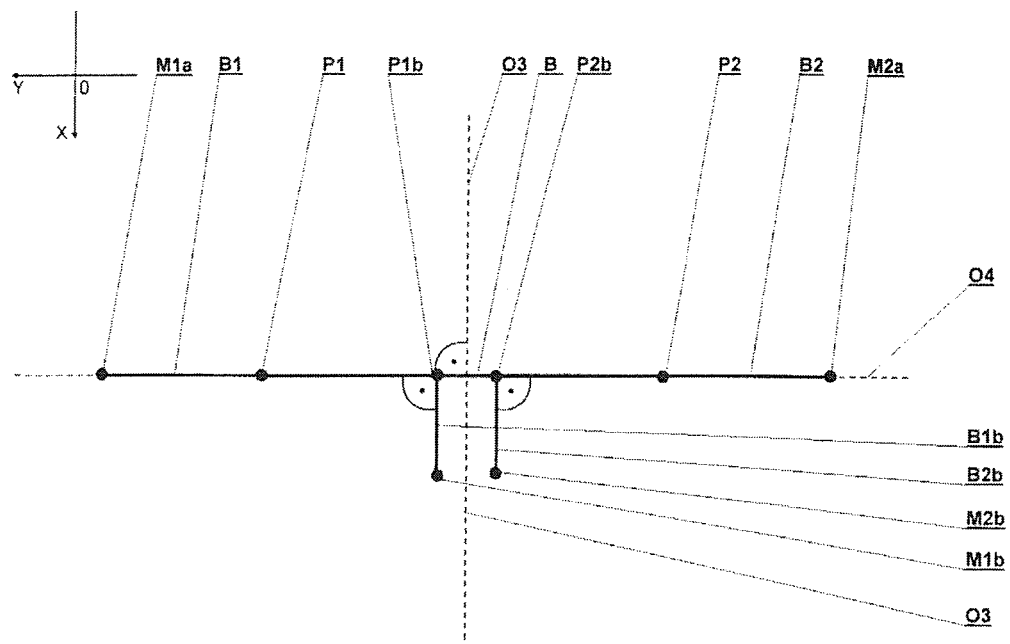
Figure 7:
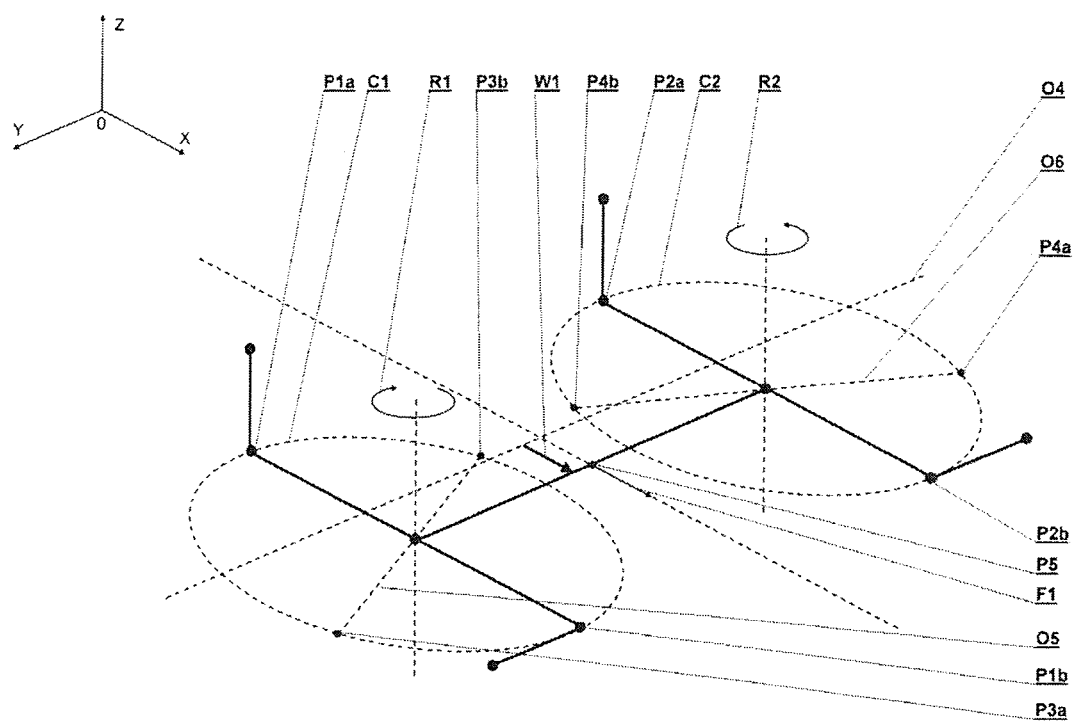
Figure 8:
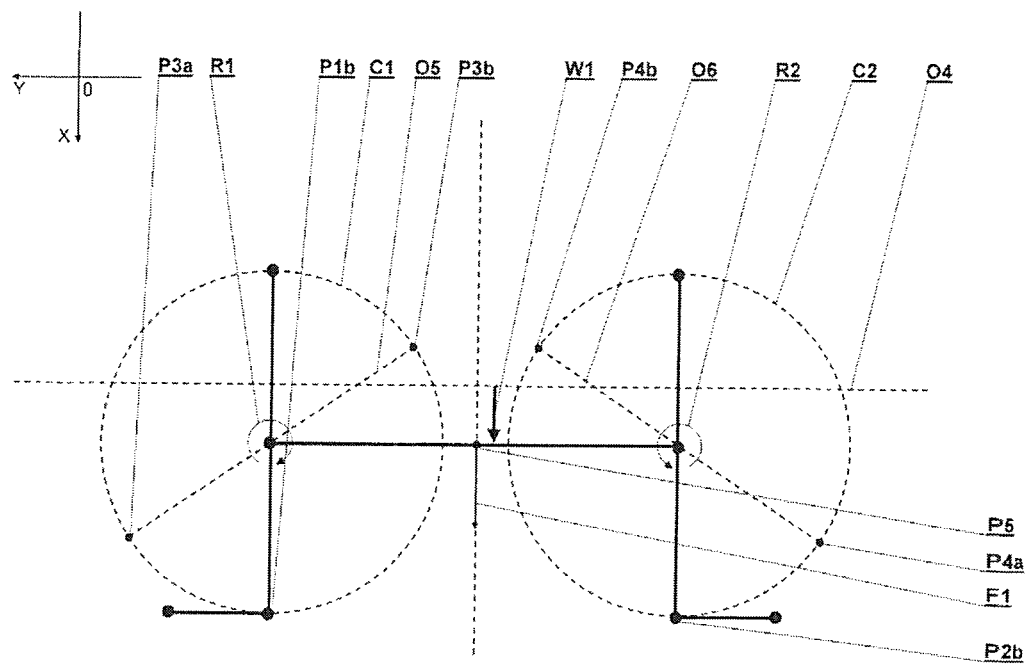
Figure 9:
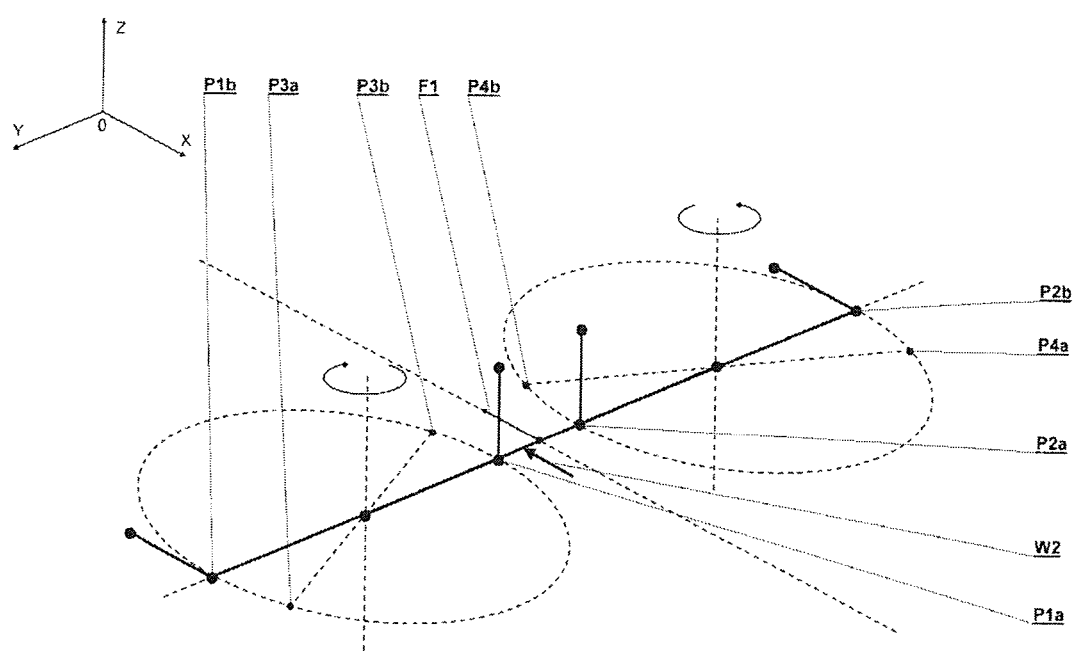
Figure 10:
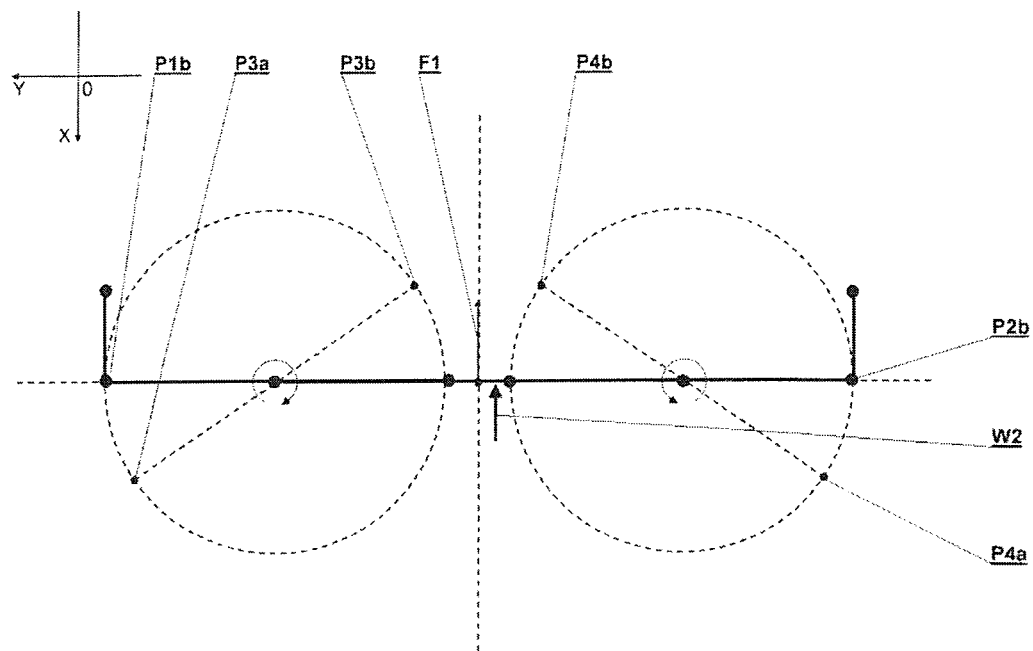
Figure 11:
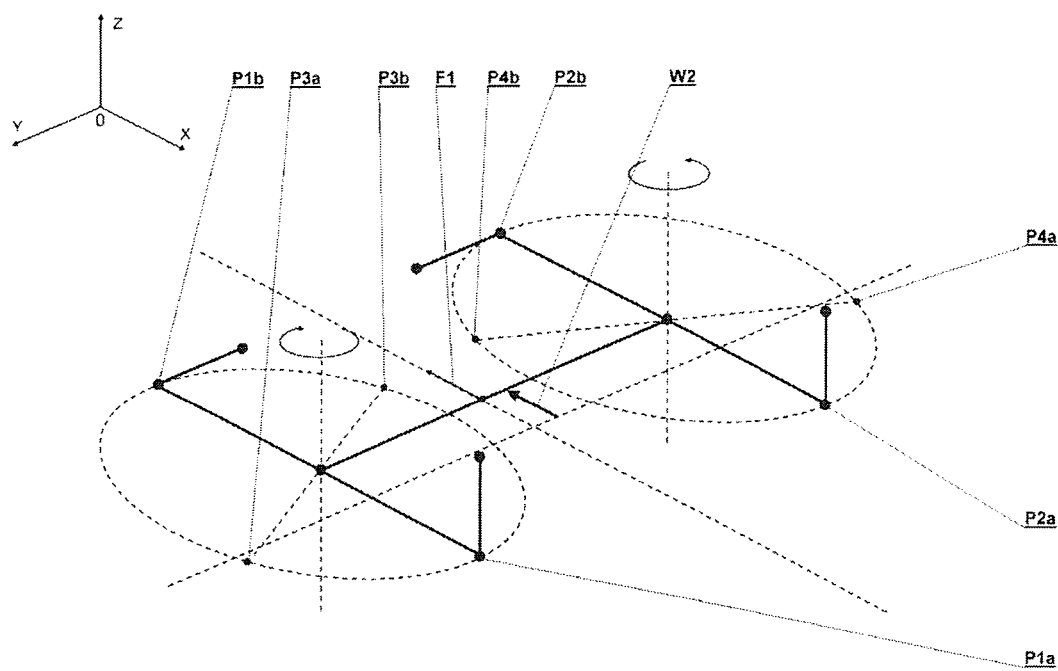
Figure 12:
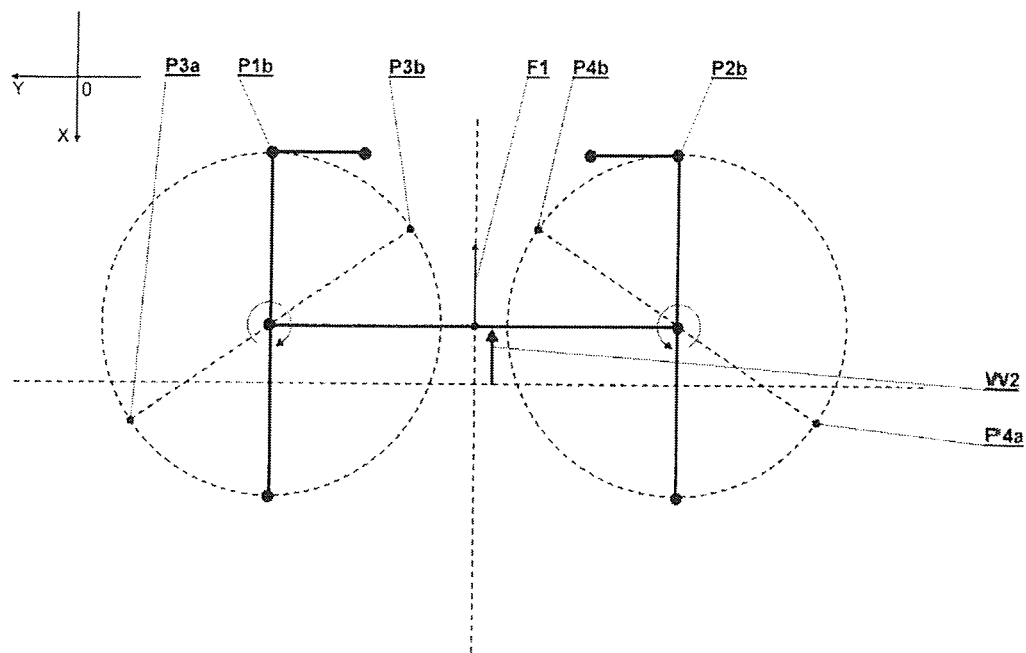
Figure 13:
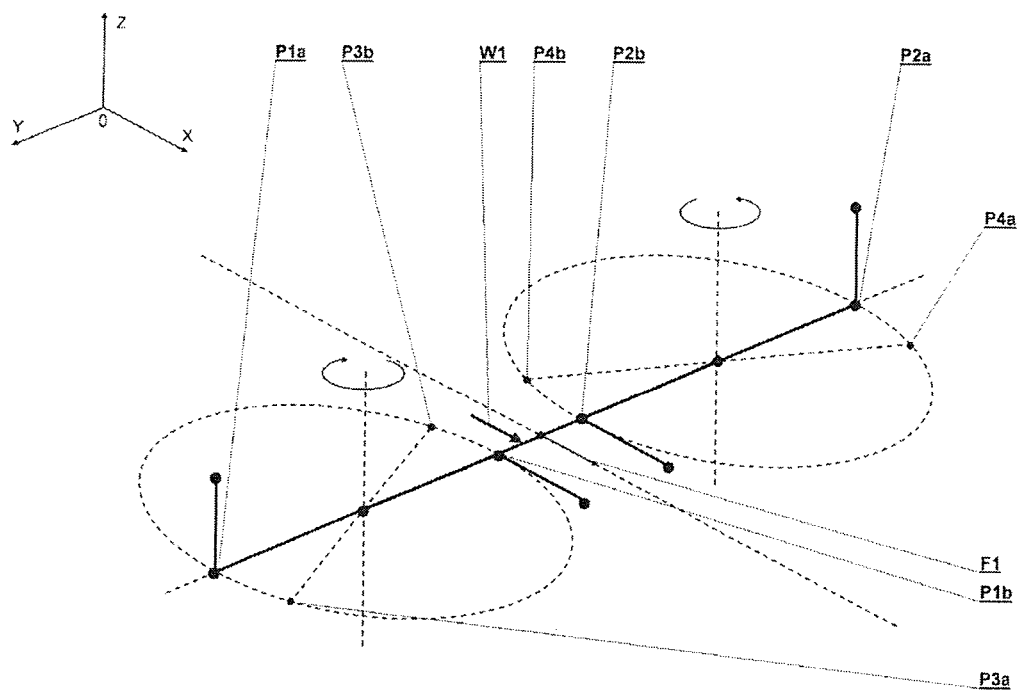
Figure 14:
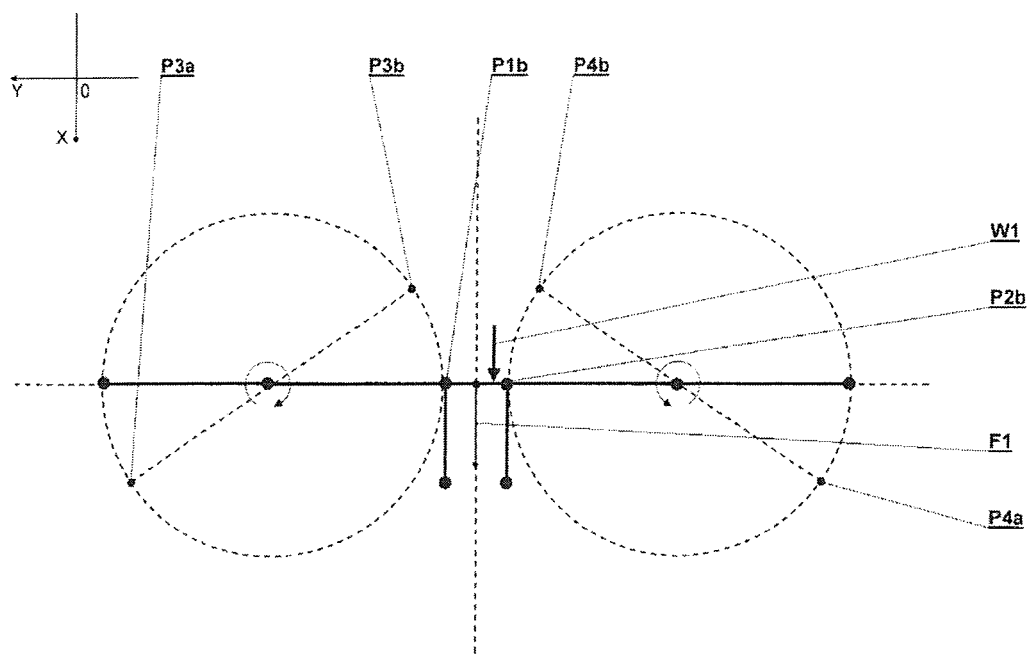
Figure 15:
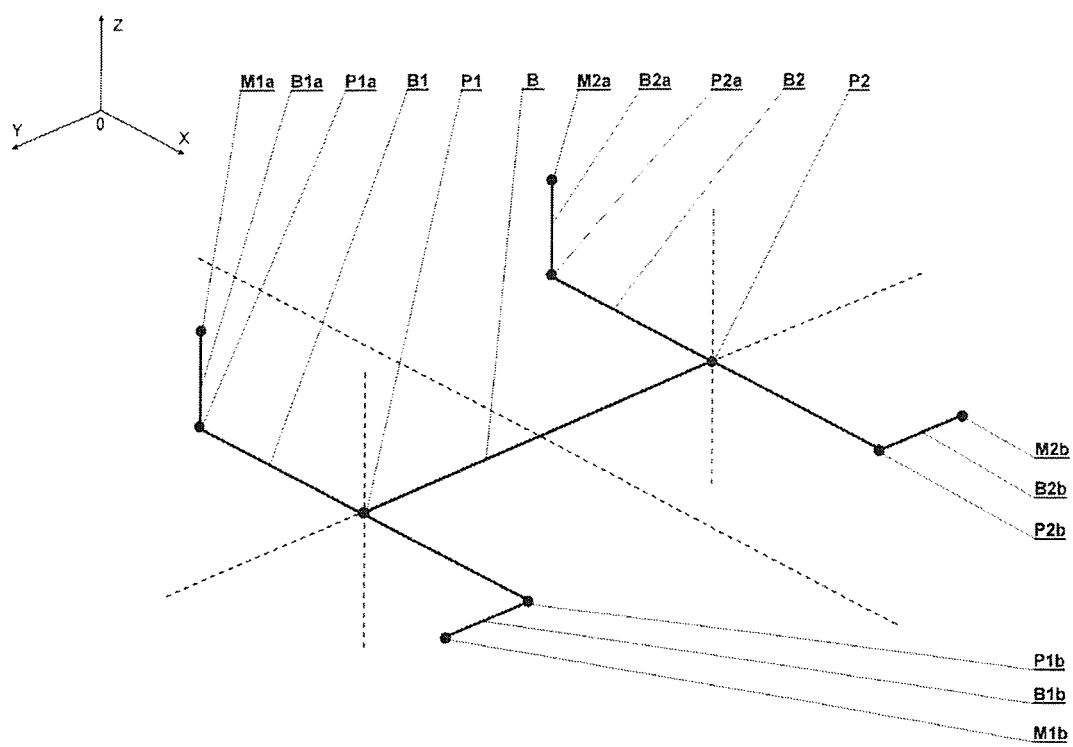
Figure 16:
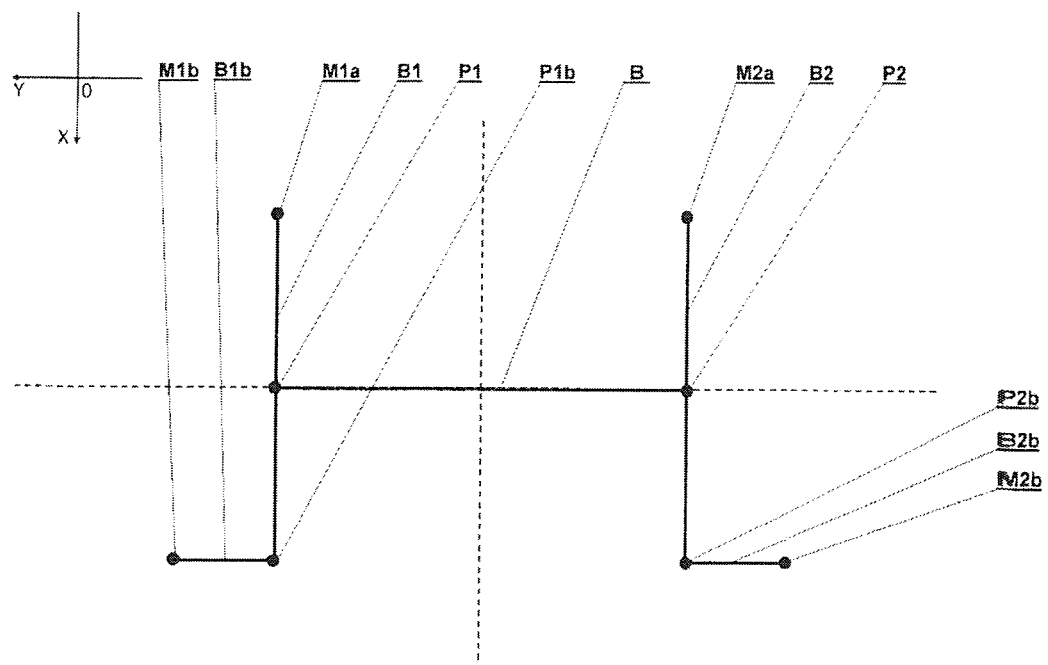
Figure 17:
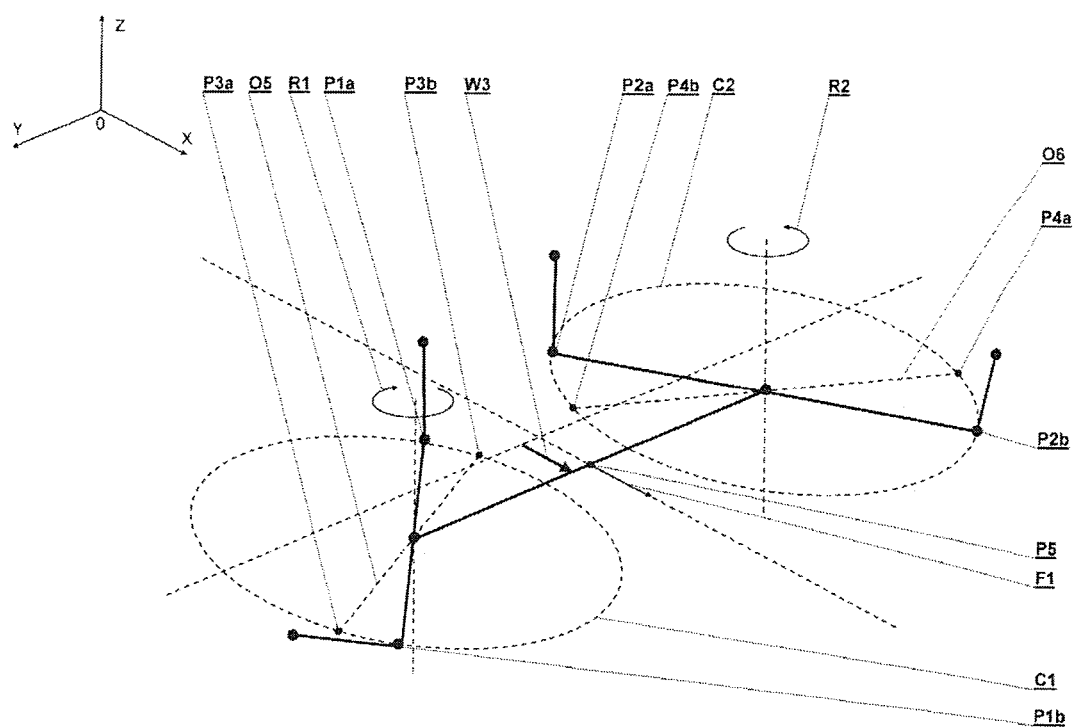
Figure 18:
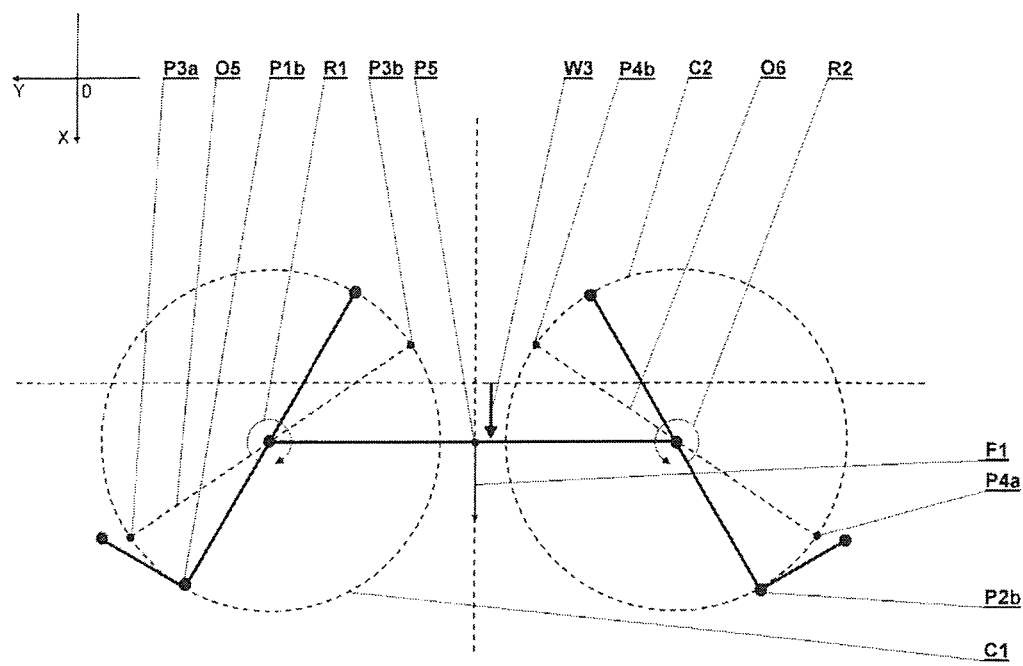
Figure 19:
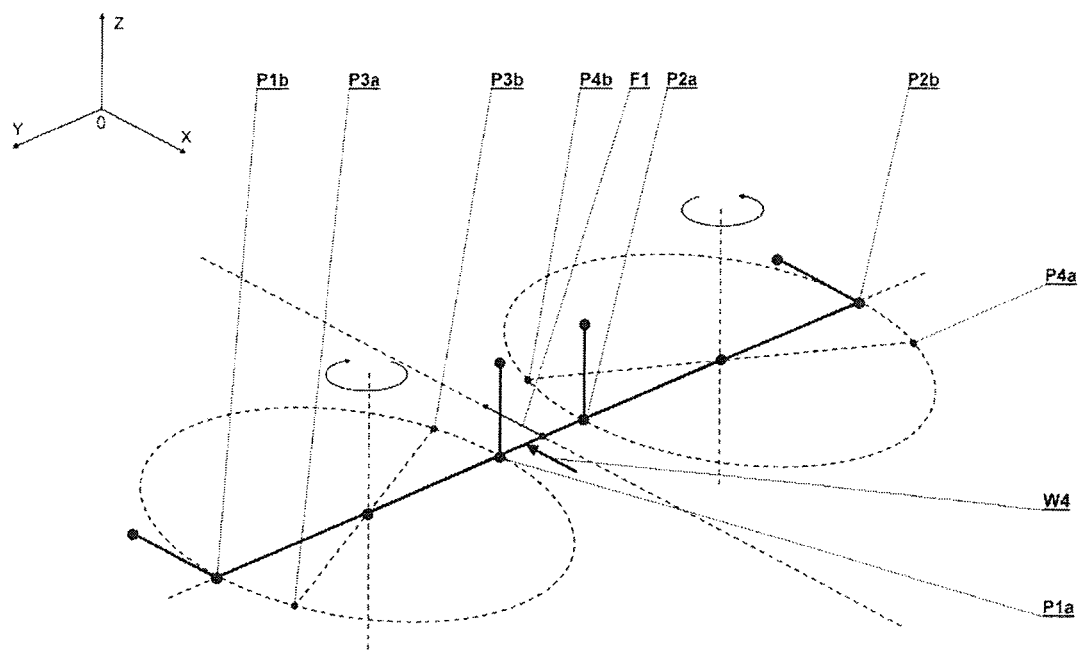
Figure 20:
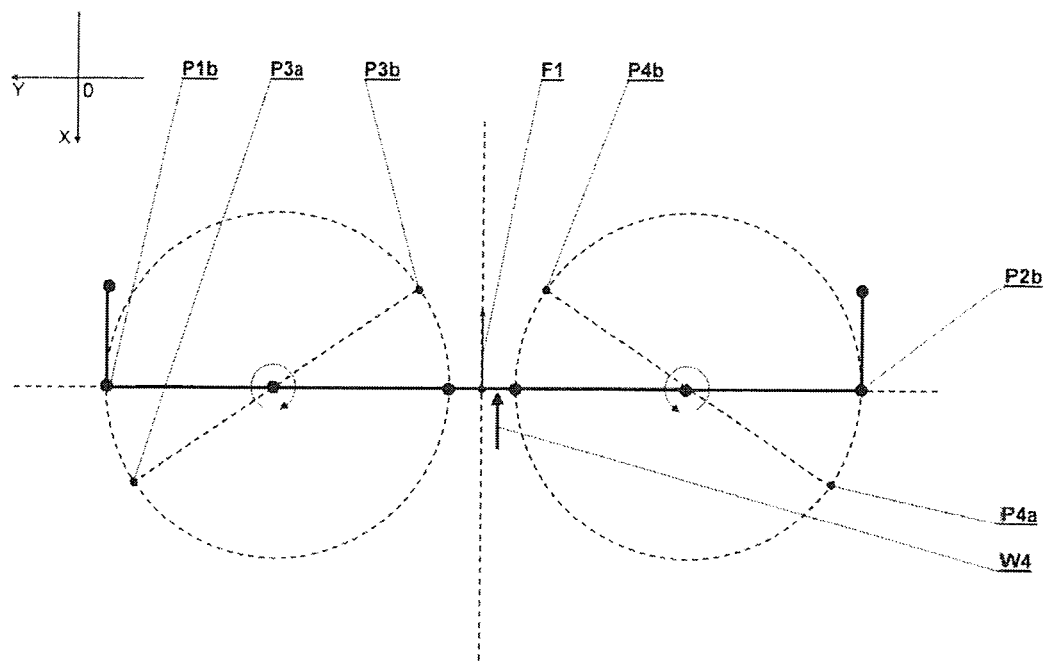
Figure 21:
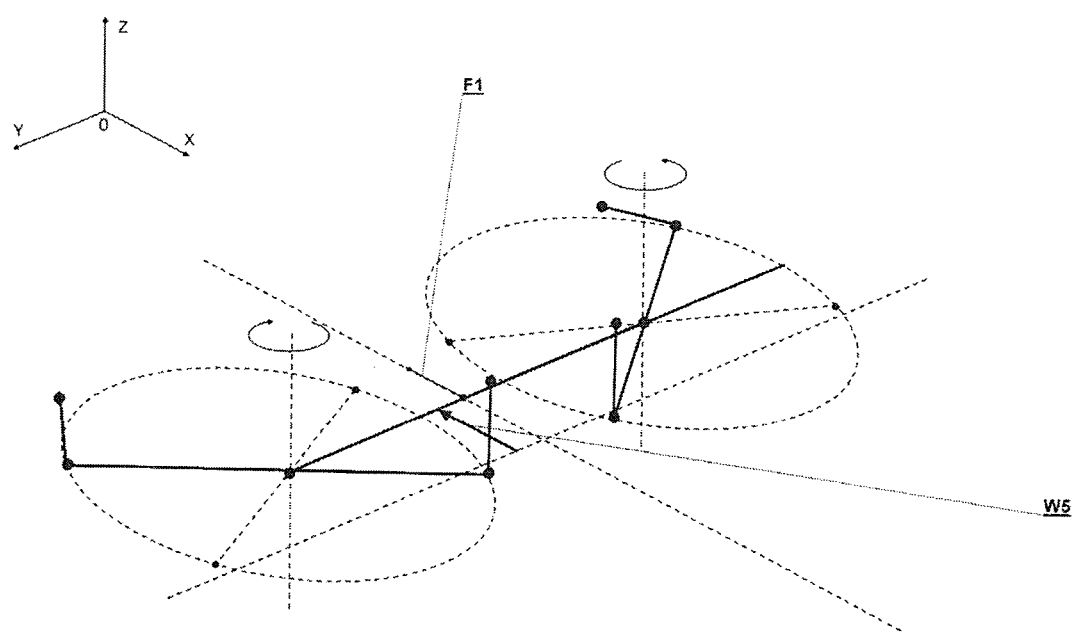
Figure 22:
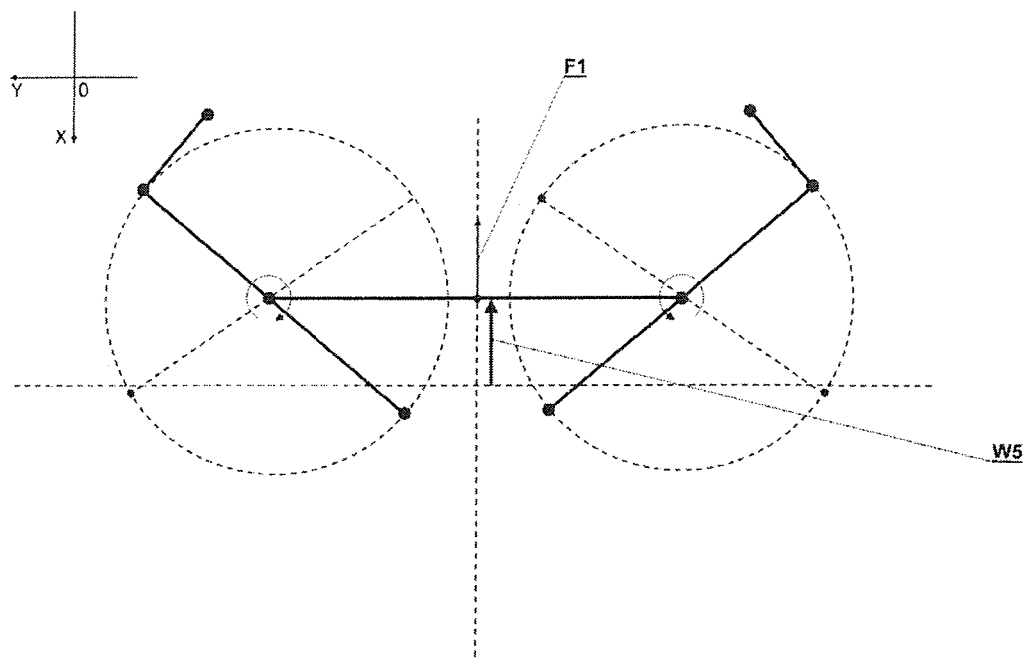
Figure 23:
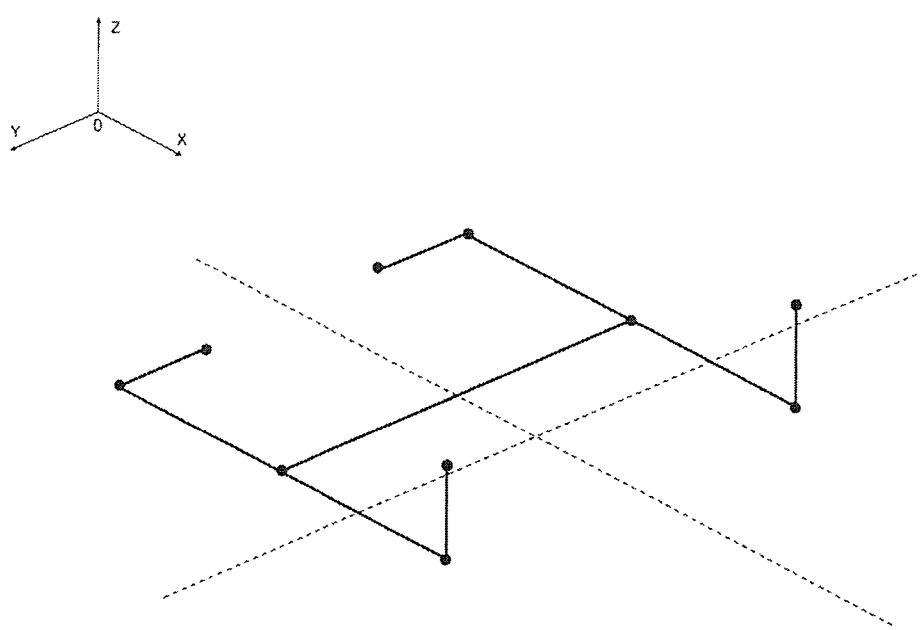
Figure 24:
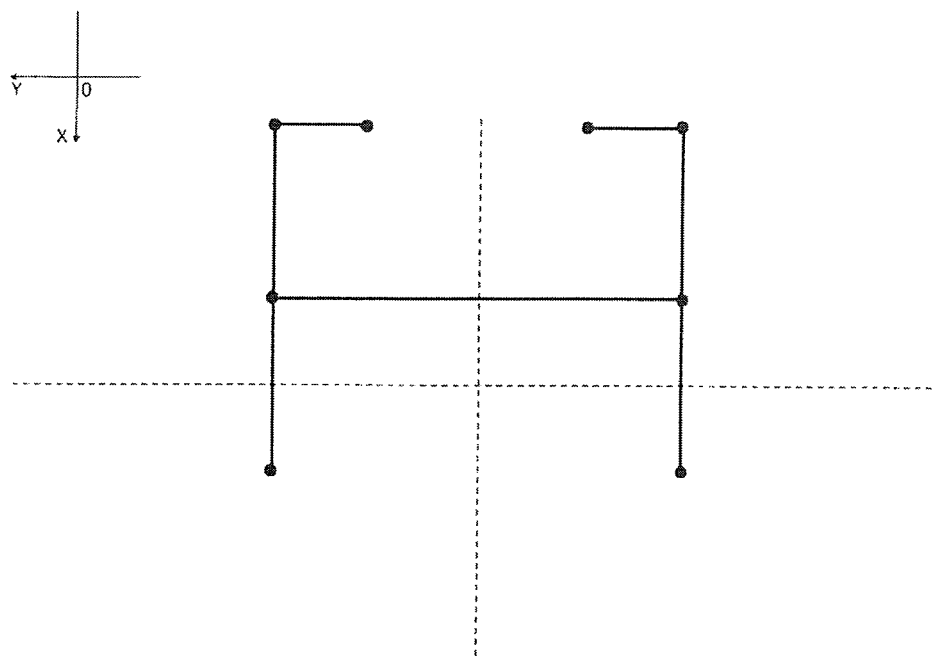
Figure 25:
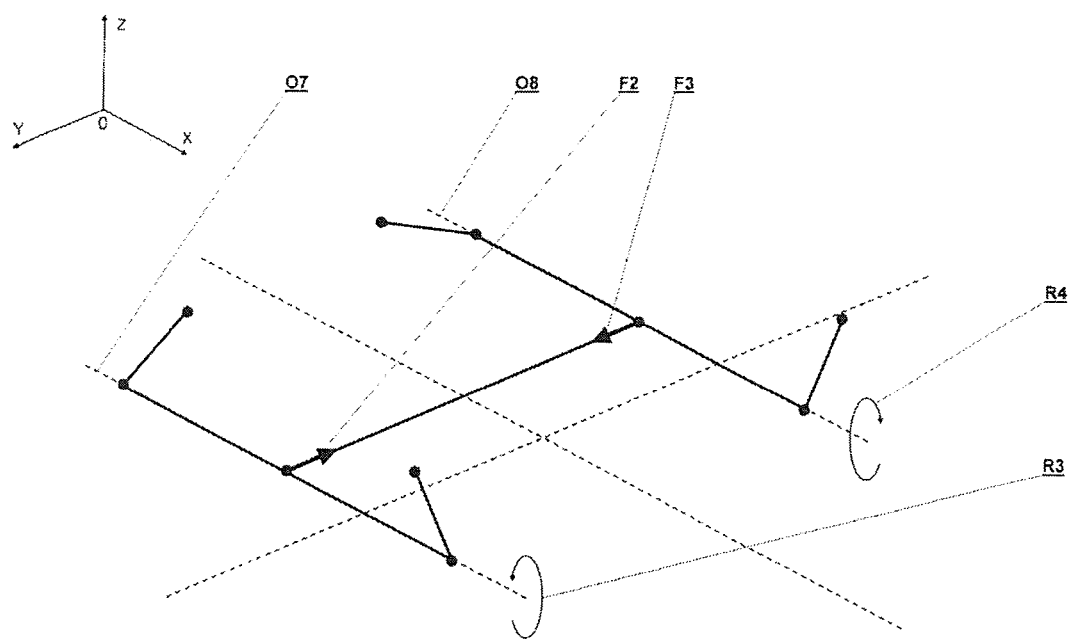
Figure 26:
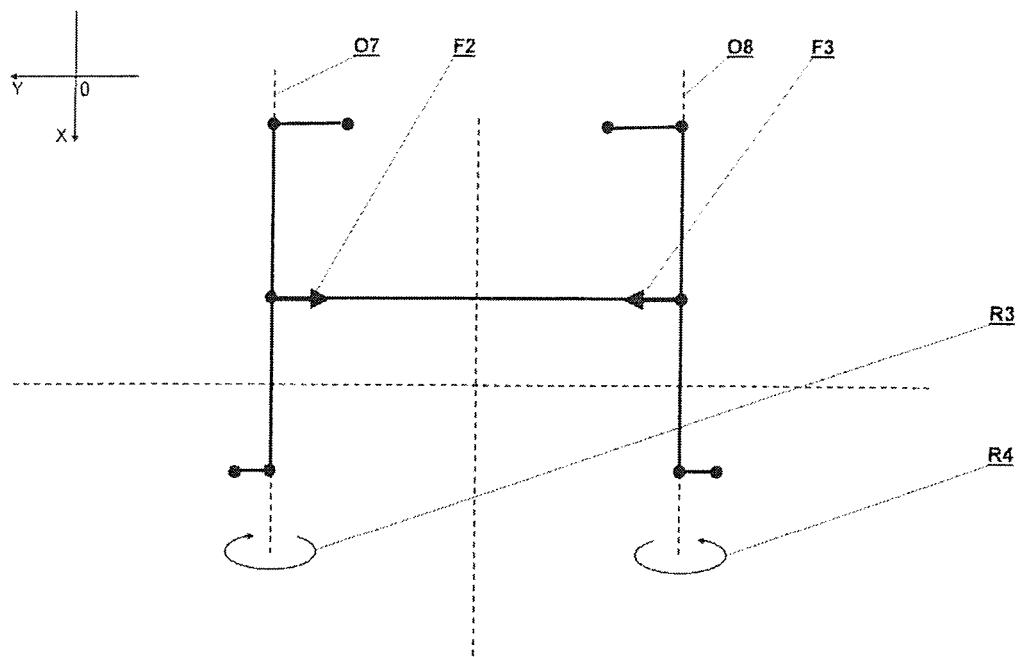
Figure 27:
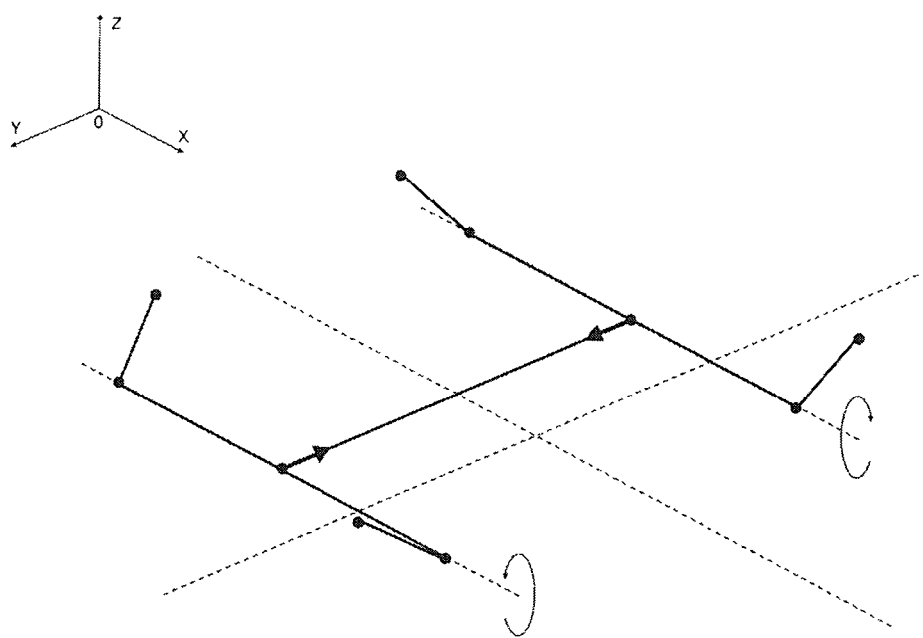
Figure 28:
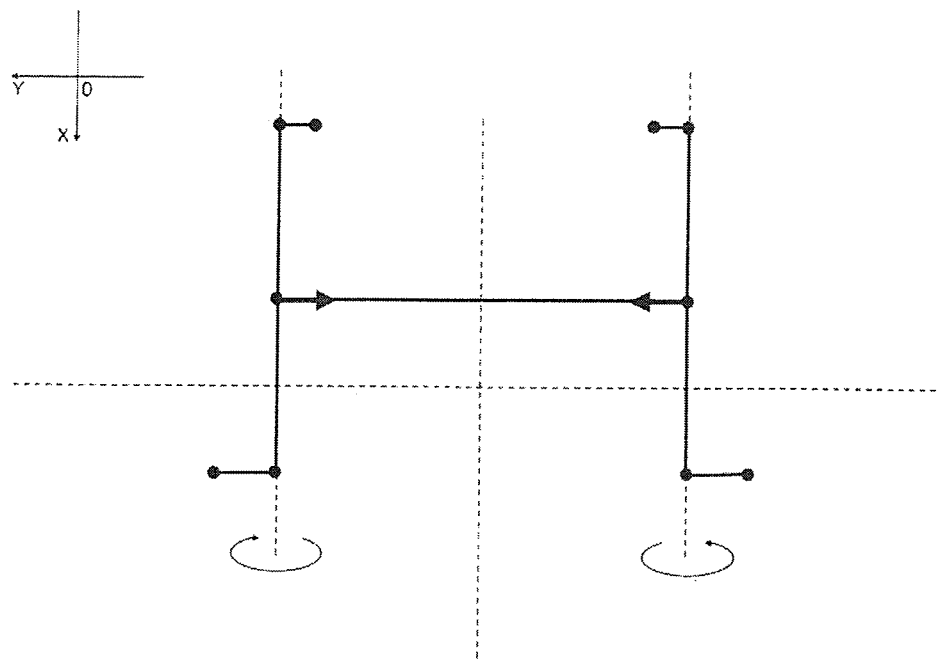
Figure 29:
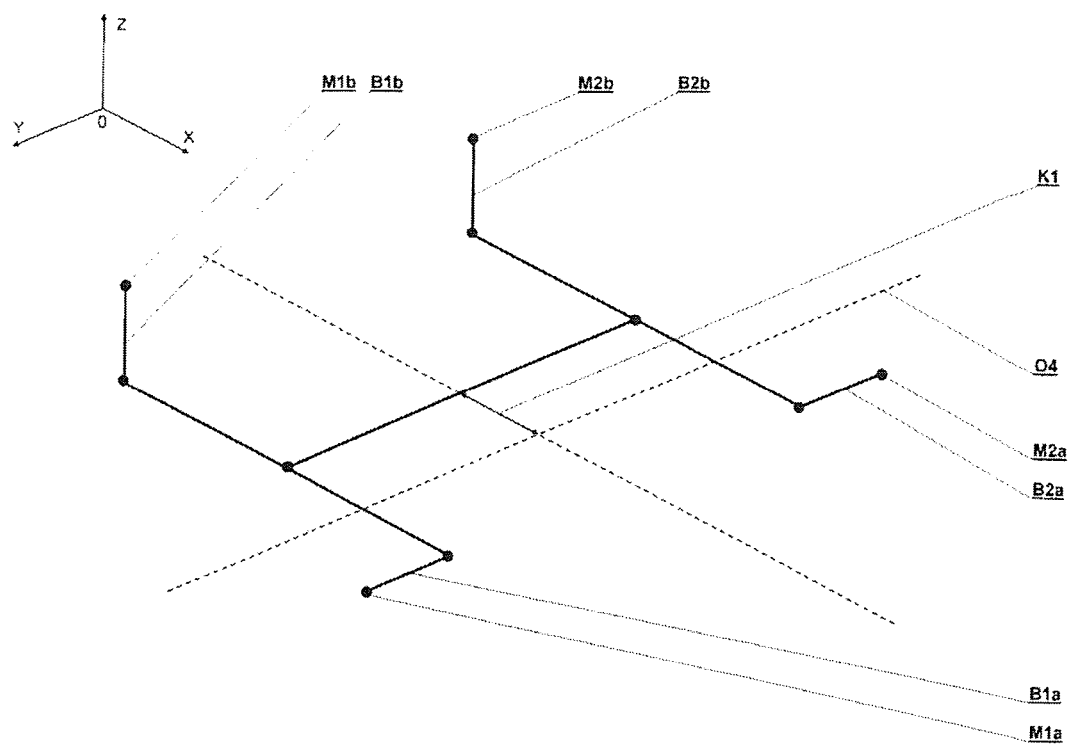
Figure 30:
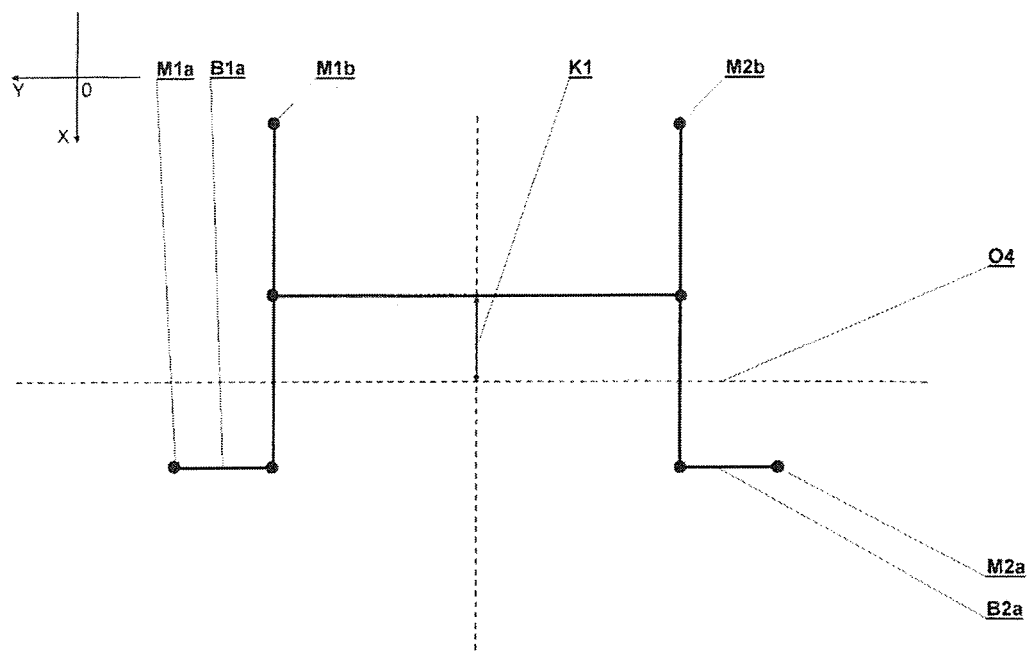
Figure 31:
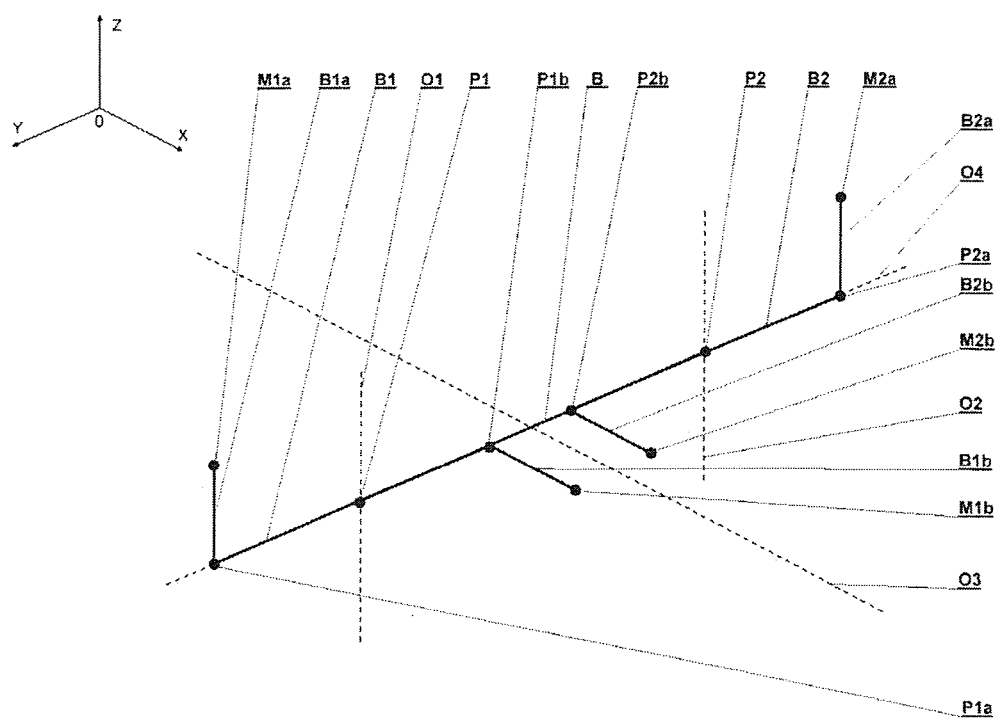
Figure 32:
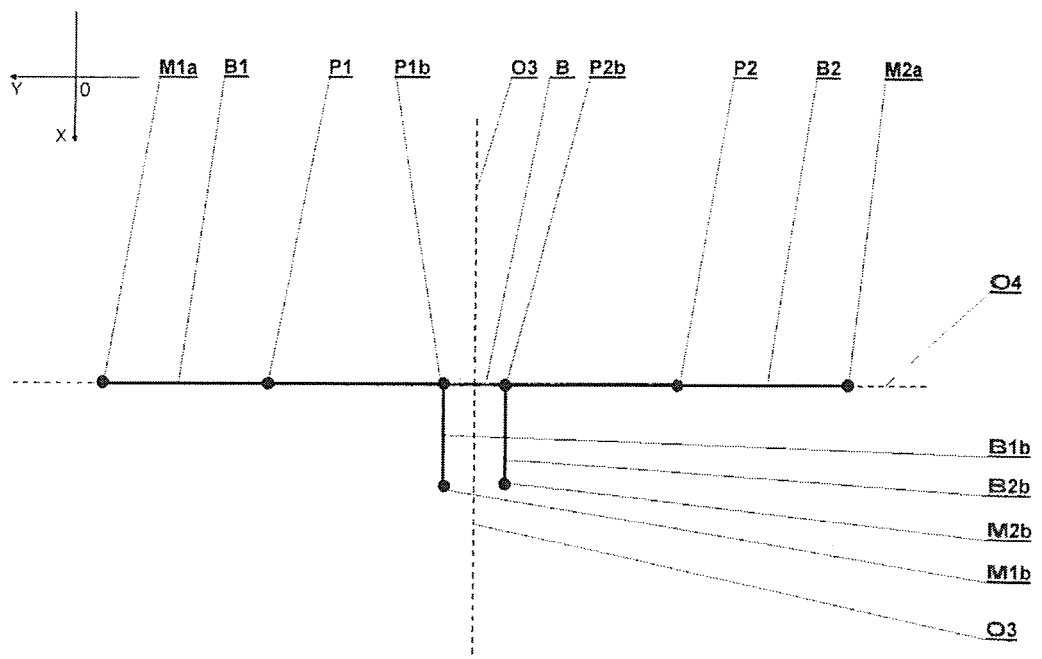
Figure 33:
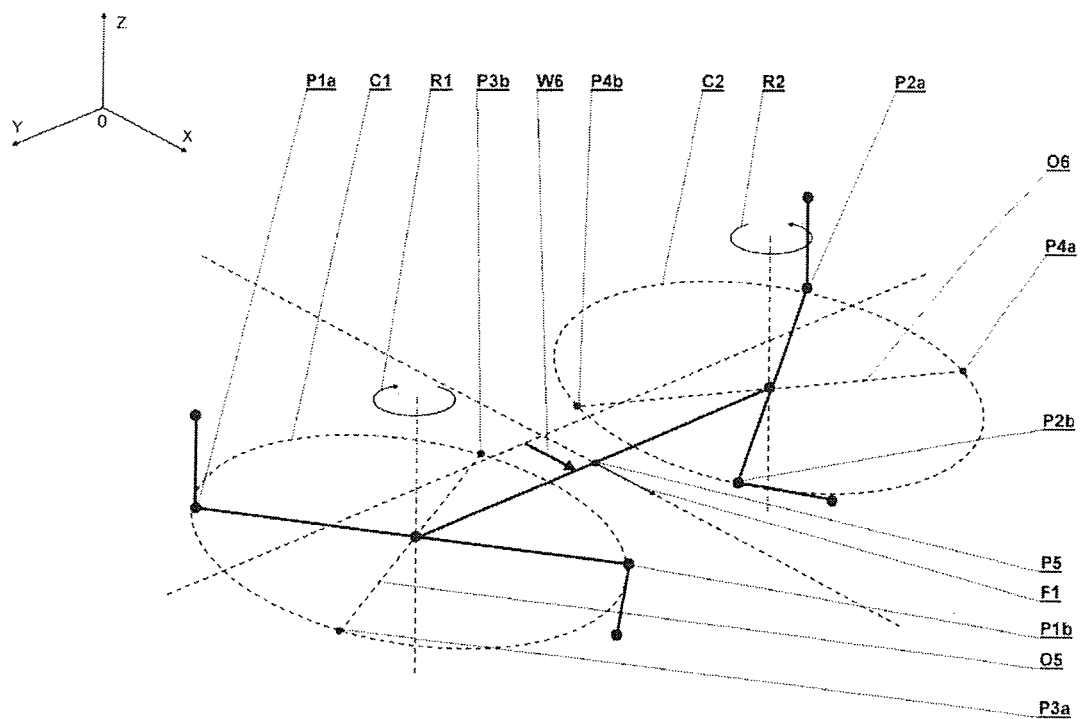
Figure 34:
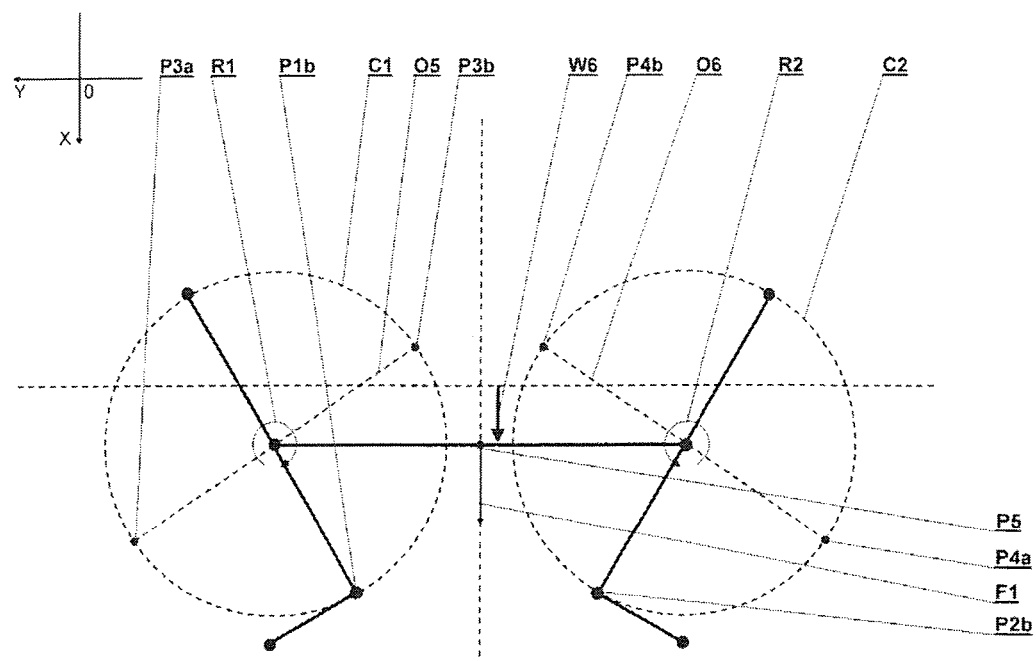
Figure 35:
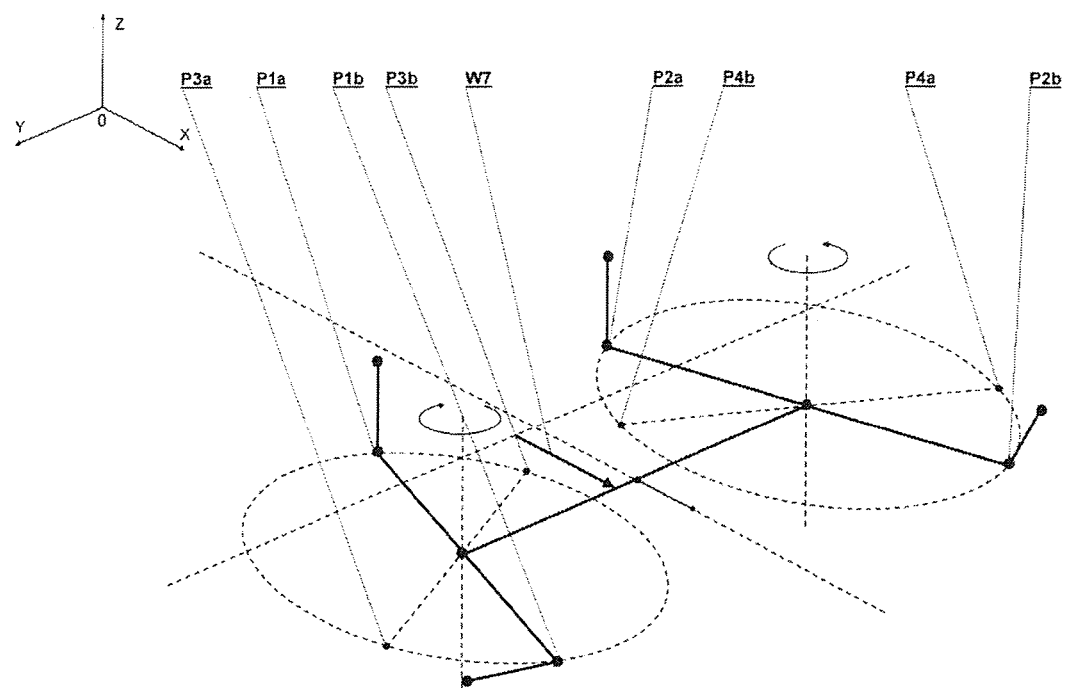
Figure 36:
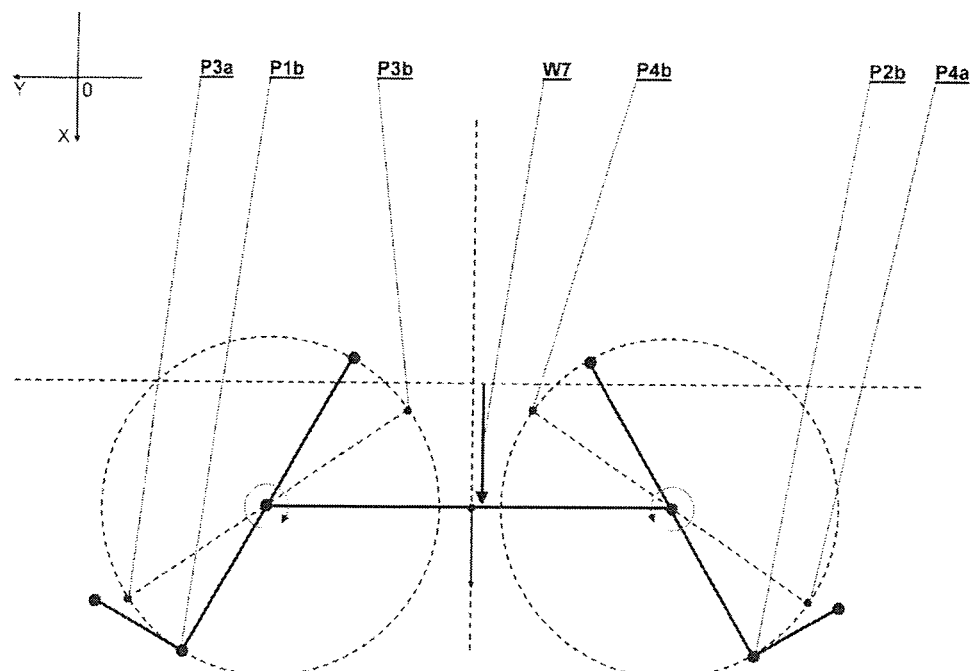
Figure 37:
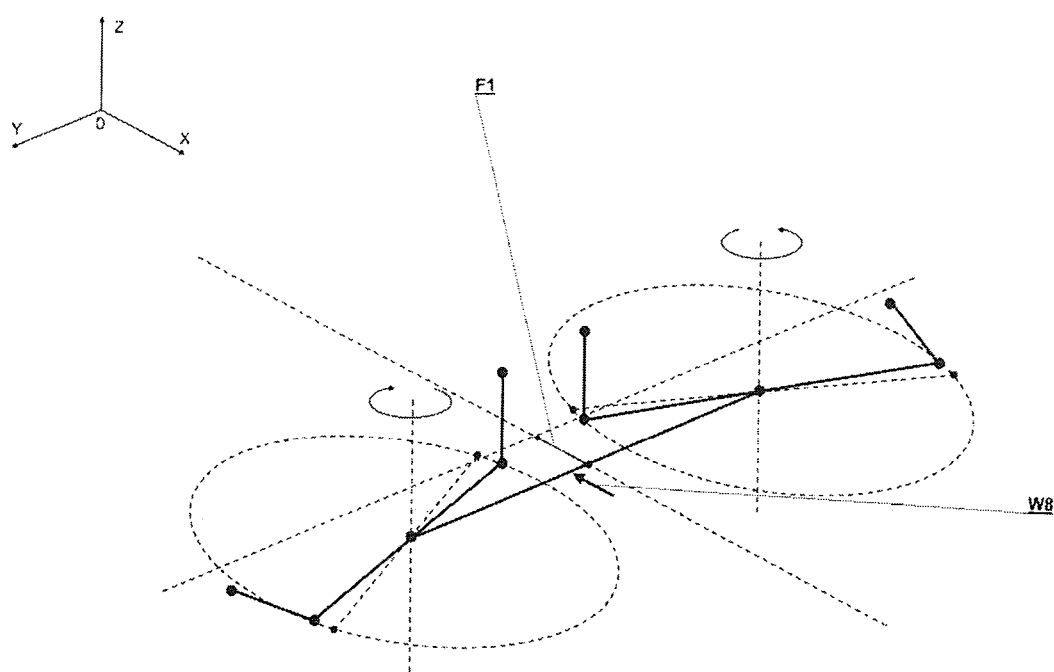
Figure 38:
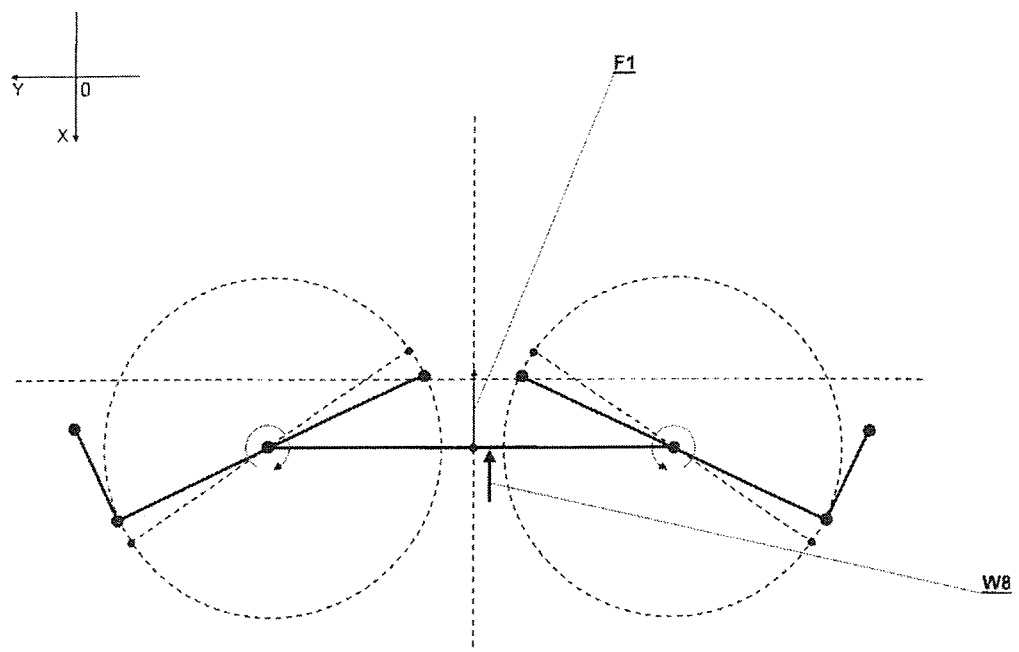
Figure 39:
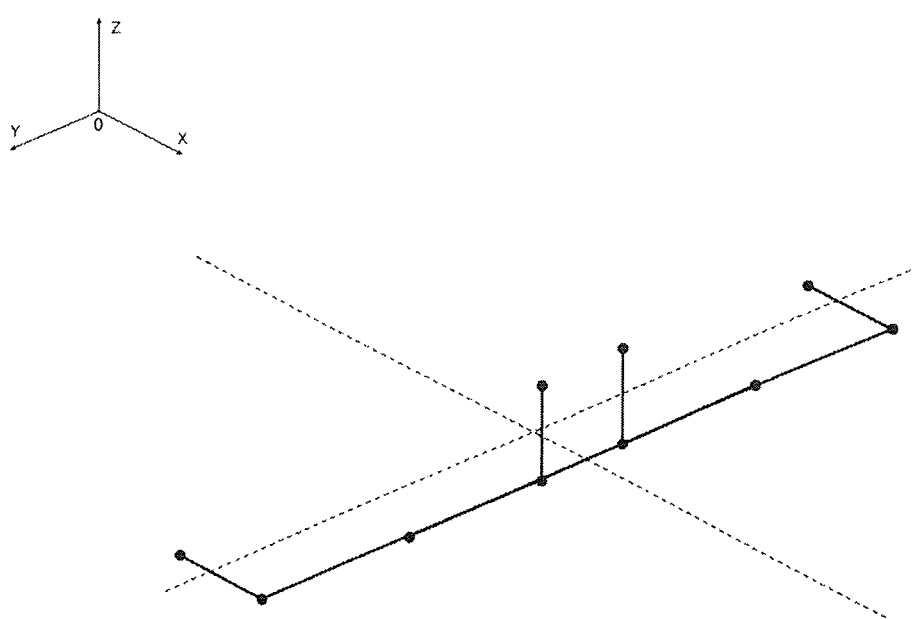
Figure 40:
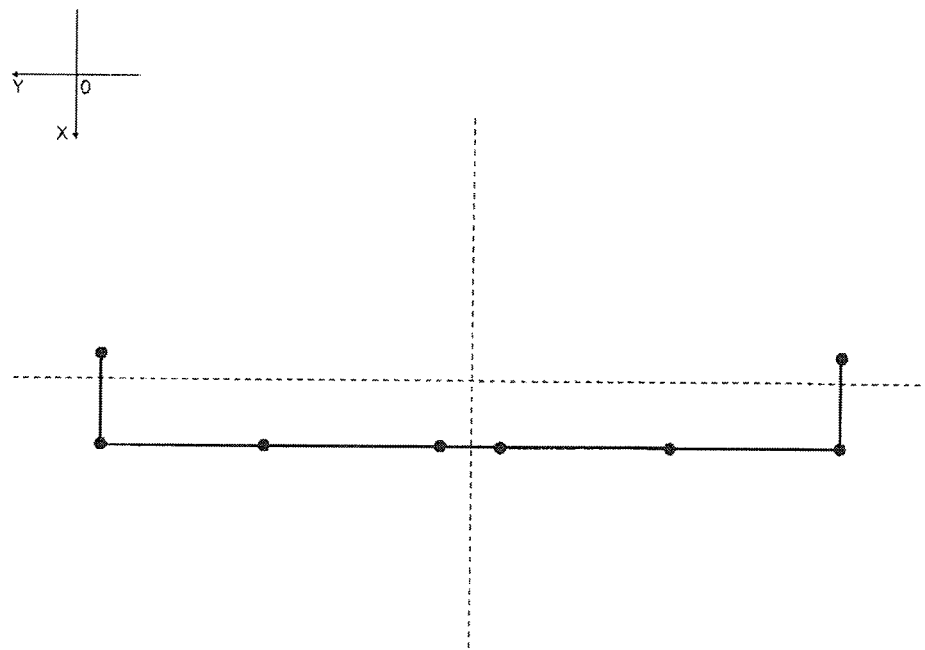
Figure 41:
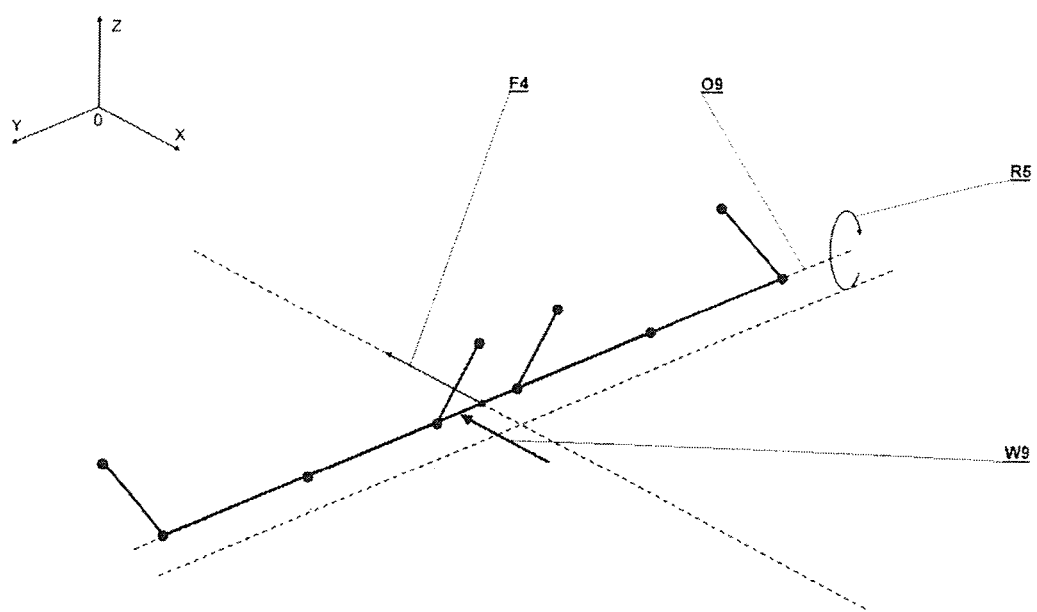
Figure 42:
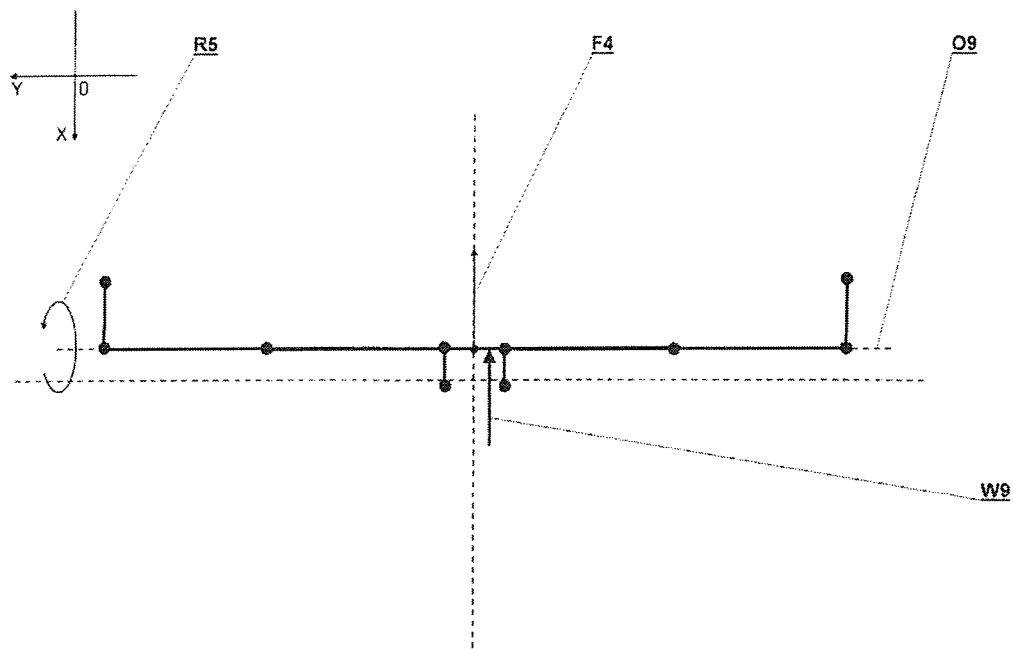
Figure 43:
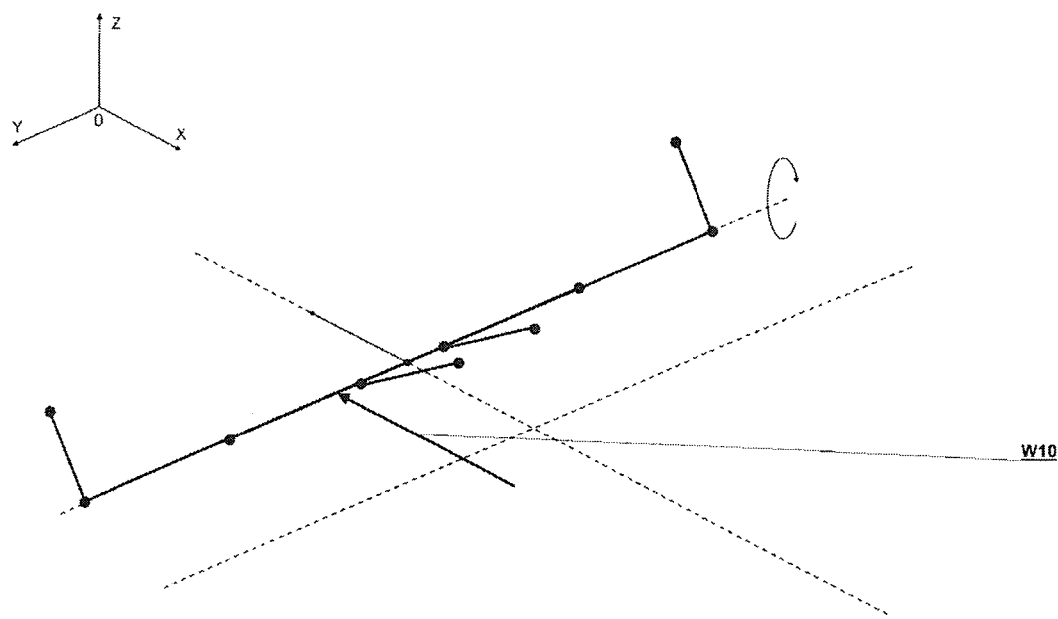
Figure 44:
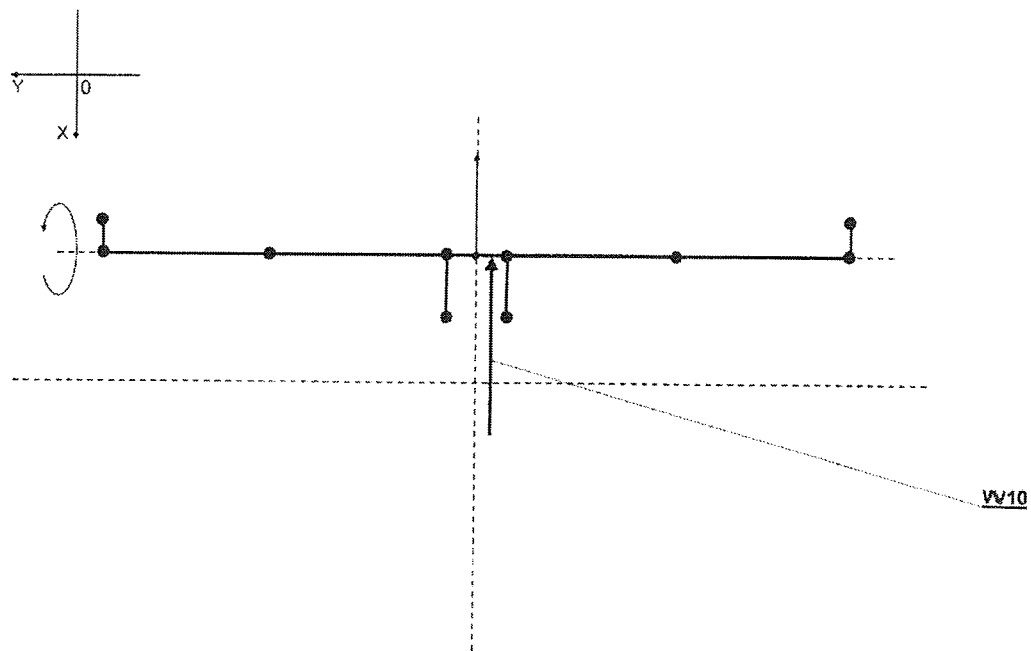
Figure 45:
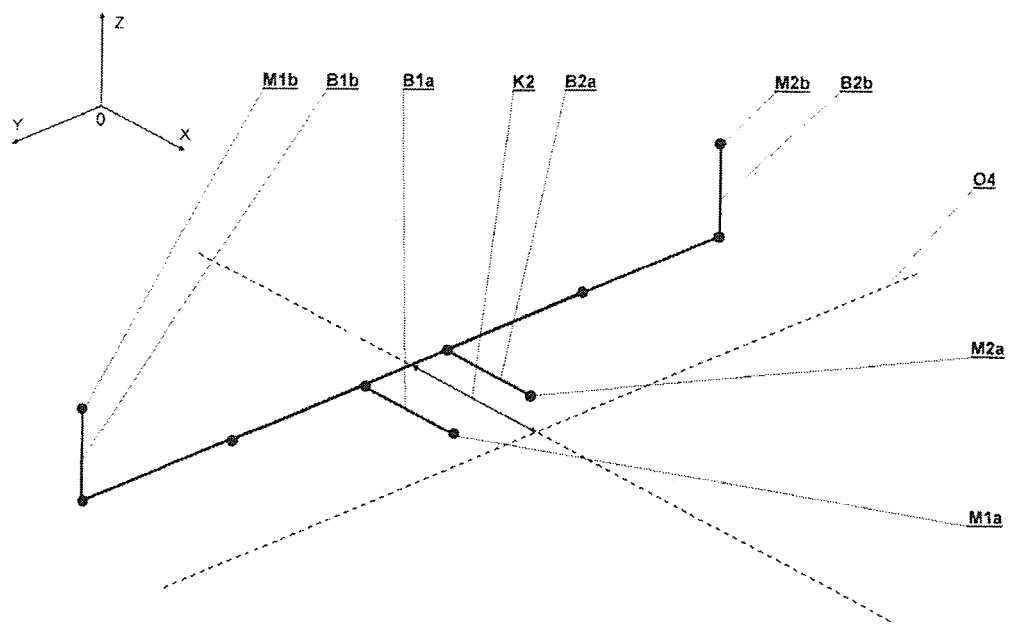
Figure 46:
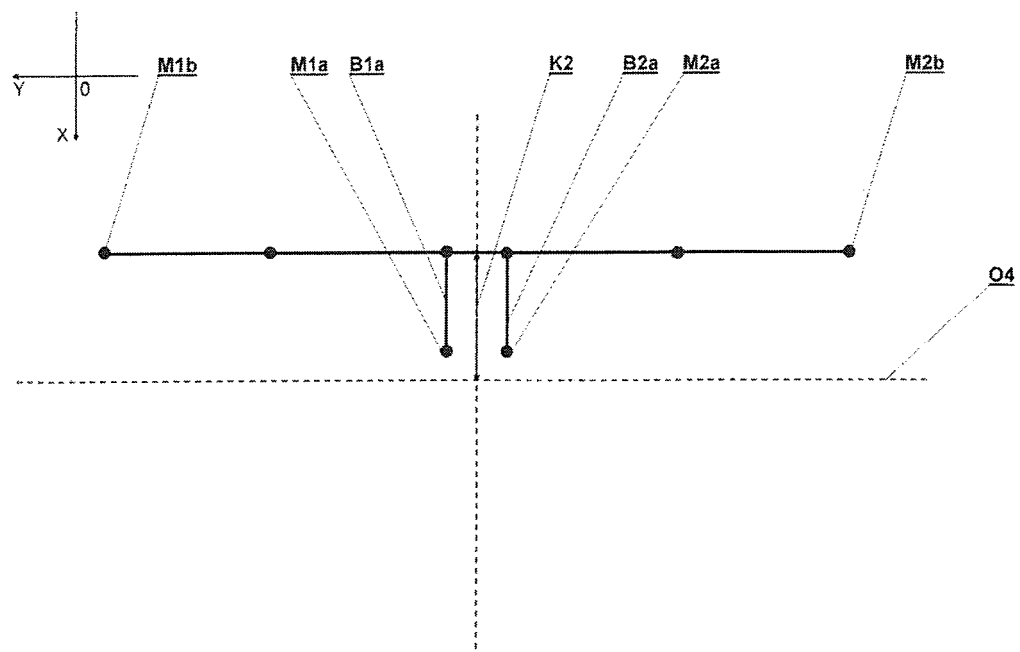
Figure 47:
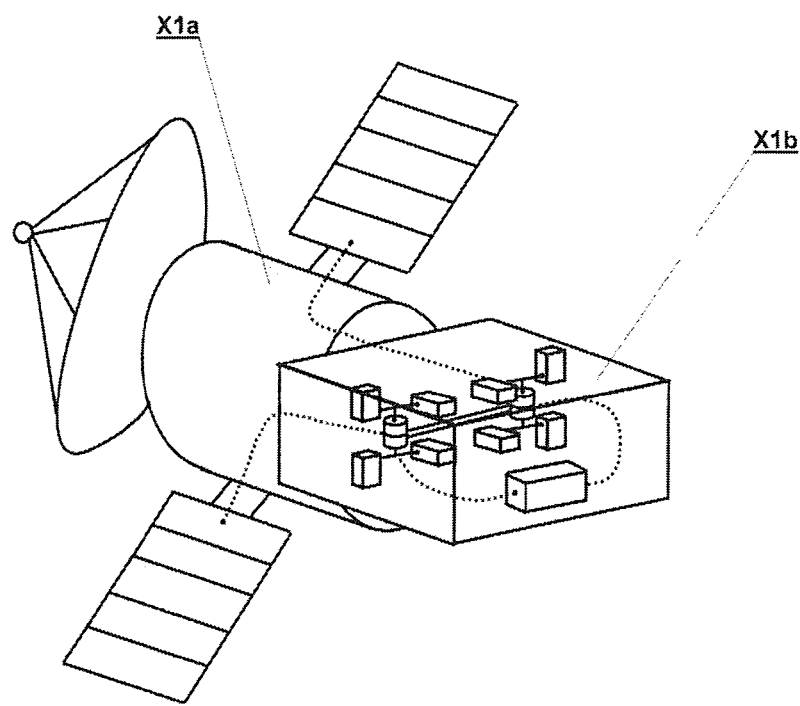
Figure 48:
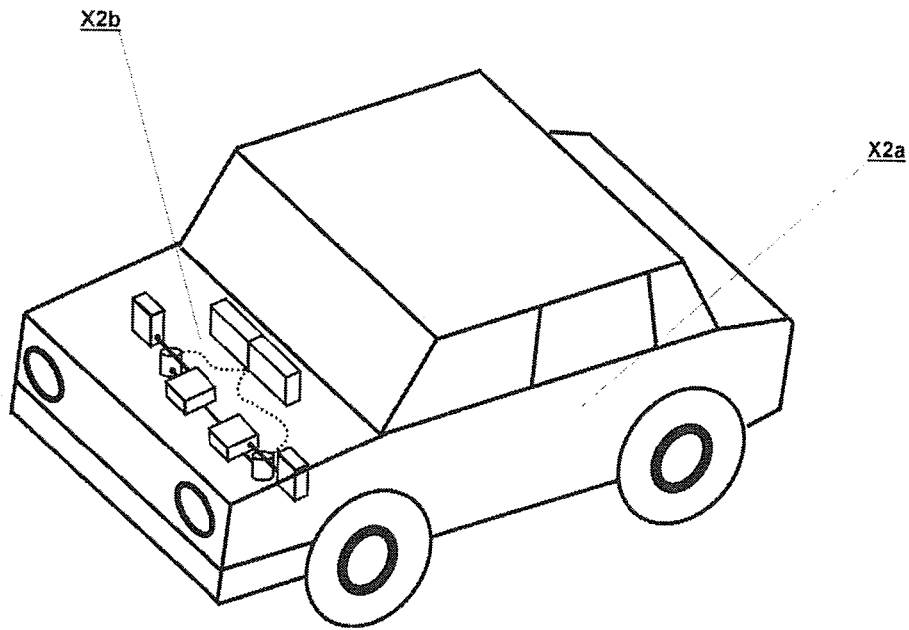
Figure 49:
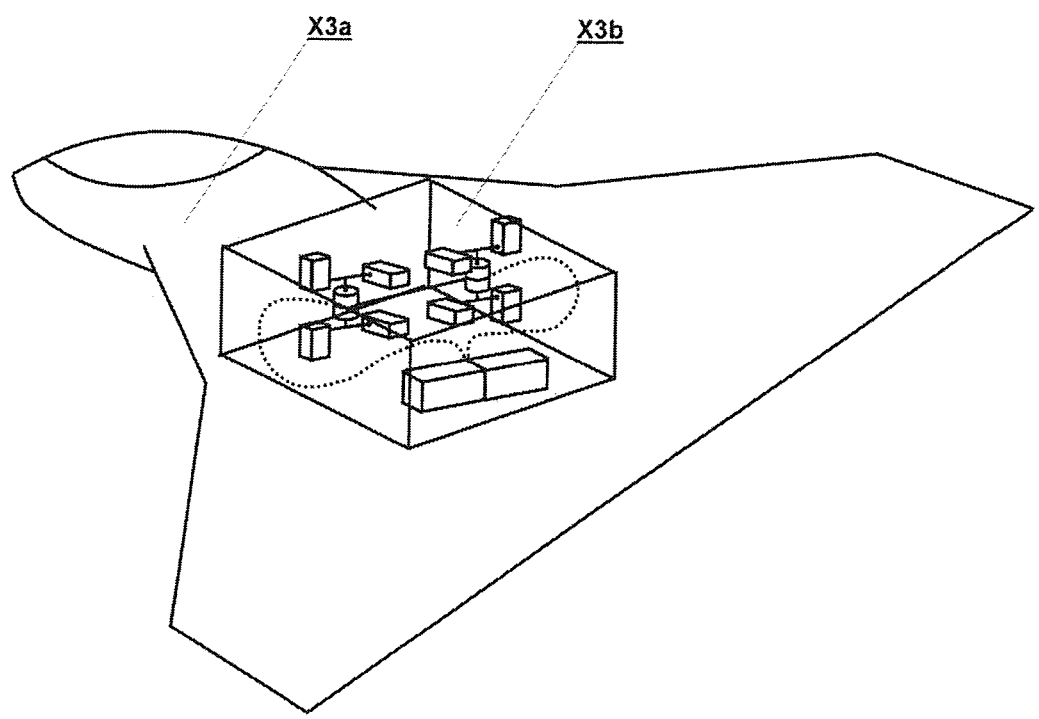
Figure 50:
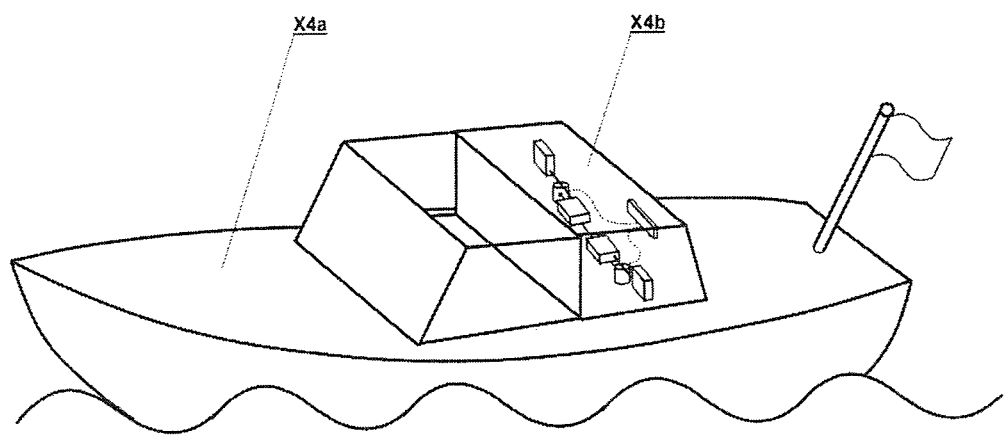

The following figures are shown in the diagrams:

FIG. 1 diagram of the propulsion unit;

FIG. 2 a model of the propulsion unit in axonometric projection;

FIG. 3a a model of the propulsion unit in projection on the XZ plane;

FIG. 3b a model of the propulsion unit in projection on the YZ plane;

FIG. 3c a model of the propulsion unit in projection on the XY plane;

FIG. 4 a diagram of the propulsion unit with the layout of the pivot arms, centres of gravity and pivot points drawn in;

FIG. 5 symbolic arrangement of the centres of gravity M1a and M1b and M2a and M2b in an axonometric projection of the propulsion unit in its rest start position;

FIG. 6 symbolic arrangement of the centres of gravity M1a and M1b and M2a and M2b in an overhead projection in its rest start position;

FIG. 7 the arrangement of the pivot arms, the centres of gravity and pivot points of the propulsion unit in axonometric view in the same position during simultaneous rotation of the B1 and B2 arms showing the direction and orientation of the resultant force F1;

FIG. 8 the arrangement of the pivot arms, the centres of gravity and pivot points of the propulsion unit in an overhead projection in the same position during simultaneous rotation of the arms B1 and B2 , showing the direction and orientation of the resultant force F1;

FIG. 9 the arrangement of the pivot arms, the centres of gravity and pivot points of the propulsion unit in axonometric projection in the same position still under simultaneous rotation of the B1 and B2 arms showing the direction and orientation of the resultant force F1;

FIG. 10 the arrangement of the pivot arms, centres of gravity and pivot points of the propulsion unit in an overhead projection in the same position still under simultaneous rotation of the B1 and B2 arms showing the direction and orientation of the resultant force F1;

FIG. 11 the arrangement of the pivot arms, the centres of gravity and pivot points of the propulsion unit in axonometric projection in the same position still under simultaneous rotation of the B1 and B2 arms showing the direction and orientation of the resultant force F1;

FIG. 12 the arrangement of the pivot arms, centres of gravity and pivot points of the propulsion unit in an overhead projection in the same position still under simultaneous rotation of the B1 and B2 arms showing the direction and orientation of the resultant force F1;

FIG. 13 the arrangement of the pivot arms, the centres of gravity and pivot points of the propulsion unit in axonometric projection in the same position still under simultaneous rotation of the B1 and B2 arms showing the direction and orientation of the resultant force F1 while varying the force F1 orientation and the displacement vector W1;

FIG. 14 the arrangement of the pivot arms, the centres of gravity and the pivot points of the propulsion unit in an overhead projection in the same position still under the simultaneous rotation of the arms B1 and B2 , showing the direction and orientation of the resultant force F1, while the force F1 orientation and the displacement vector W1 change;

FIG. 15 starting rest position according to the first diagram (position according to FIG. 7) in axonometric projection FIG. 16 starting rest position according to the first diagram (position according to FIG. 8) in an overhead projection;

FIG. 17 successive phase of simultaneous rotation of the base motors by essentially 180°, initial phase of rotation of arms B1 and B2 according to the first diagram in axonometric projection;

FIG. 18 successive phase of simultaneous rotation of the base motors by essentially 180°, initial phase of rotation of arms B1 and B2 according to the first diagram in an overhead projection;

FIG. 19 successive phase of simultaneous rotation of the base motors by essentially 180°, middle phase of rotation of the B1 and B2 arms according to the first diagram in axonometric projection;

FIG. 20 successive phase of simultaneous rotation of the base motors by essentially 180°, middle phase of rotation of arms B1 and B2 according to the first diagram in an overhead projection;

FIG. 21 successive phase of simultaneous rotation of the base motors by essentially 180°, final phase of rotation of arms B1 and B2 according to the first diagram in axonometric projection;

FIG. 22 successive phase of simultaneous rotation of the base motors by essentially 180°, the final phase of rotation of arms B1 and B2 according to the first diagram in an overhead projection;

FIG. 23 after rotation of the base motors by essentially 180°, the central resting position according to the first diagram in axonometric projection;

FIG. 24 after rotation of the base motors by essentially 180°, the central resting position according to the first diagram in an overhead projection;

FIG. 25 after simultaneous rotation of the working motors by essentially 90°, the initial phase of rotation according to the first diagram in axonometric projection;

FIG. 26 after simultaneous rotation of the working motors by essentially 90°, the initial phase of rotation according to the first diagram in an overhead projection;

FIG. 27 after simultaneous rotation of the working motors by essentially 90°, the final phase of rotation according to the first diagram in axonometric projection;

FIG. 28 after simultaneous rotation of the working motors by essentially 90°, the final phase of rotation according to to the first diagram in an overhead projection;

FIG. 29 after cessation of rotation of the working motors, final rest position (as the load elements, working motors, base motors and all mounting elements are essentially identical this position is identical to the starting rest position in FIG. 15) according to the first diagram in axonometric projection;

FIG. 30 after cessation of rotation of the working motors, final rest position (as the loading elements, working motors, base motors and all mounting elements are essentially identical this position is identical to the starting rest position in FIG. 16) according to the first diagram in an overhead projection;

FIG. 31 start rest position according to the second diagram in axonometric projection;

FIG. 32 start rest position according to the second diagram (position according to FIG. 8) in an overhead projection;

FIG. 33 successive phase of simultaneous rotation of the base motors by essentially 180°, initial phase of rotation of arms B1 and B2 according to the second diagram in axonometric projection;

FIG. 34 successive phase of simultaneous rotation of the base motors by essentially 180°, initial phase of rotation of arms B1 and B2 according to the second diagram in an overhead projection;

FIG. 35 successive phase of simultaneous rotation of the base motors by essentially 180°, middle phase of rotation of arms B1 and B2 according to the second diagram in axonometric projection;

FIG. 36 successive phase of simultaneous rotation of the base motors by essentially 180°, middle phase of rotation of arms B1 and B2 according to the second diagram in an overhead projection;

FIG. 37 successive phase of simultaneous rotation of the base motors by essentially 180°, the end phase of rotation of arms B1 and B2 according to the second diagram in axonometric projection;

FIG. 38 successive phase of simultaneous rotation of the base motors by essentially 180°, the end phase of rotation of arms B1 and B2 according to the second diagram in an overhead projection;

FIG. 39 after rotation of the base motors by essentially 180°, the central rest position according to the second diagram in axonometric projection;

FIG. 40 after rotation of the base motors by essentially 180°, the central rest position according to the second diagram in an overhead projection;

FIG. 41 after simultaneous rotation of the working motors by essentially 90°, the initial phase of rotation according to the second diagram in axonometric projection;

FIG. 42 after simultaneous rotation of the working motors by essentially 90°, the initial phase of rotation according to the second diagram in an overhead projection;

FIG. 43 after simultaneous rotation of the working motors by essentially 90°, the final phase of rotation according to the second diagram in axonometric projection;

FIG. 44 after simultaneous rotation of the working motors by essentially 90°, the final phase of rotation according to the second diagram in an overhead projection;

FIG. 45 after cessation of rotation of the working motors, final rest position (as the load elements, working motors, base motors and all mounting elements are essentially identical this position is identical to the starting rest position in FIG. 31) according to the second diagram in axonometric projection;

FIG. 46 after cessation of rotation of the working motors, final rest position (as the loading elements, working motors, base motors and all mounting elements are essentially identical this position is identical to the starting rest position in FIG. 32) according to the second diagram in an overhead projection;

FIG. 47 diagram of a space probe with the propulsion unit;

FIG. 48 diagram of a car with the propulsion unit;

FIG. 49 diagram of aircraft with the propulsion unit;

FIG. 50 diagram of a vessel with the propulsion unit;

DETAILED DISCUSSION OF DRAWING FIGURES

The device shown in the drawing, FIG. 1, comprises two modules fixed substantially symmetrically on both sides of a connecting mounting frame 1 and consisting of components substantially identical in terms of weight, dimensions, electrical and mechanical parameters. All propulsions are powered by an electrical power source 11, and controlled by an electronic control system 12.

The first module shown in FIG. 1 comprises a base propulsion2a, a fixing beam 3a attached thereto at half of its length, work propulsions 5a and 5b attached thereto on both sides at substantially equal distances, and load masses 7a and 7b attached thereto; and the second module comprises a base propulsion2b, a fixing beam 3b attached thereto at half of its length, work propulsions 6a and 6b attached thereto on both sides at substantially equal distances, and load elements 8a and 8b attached thereto.

A schematic model of the device according to the invention, comprising a mounting frame 1, base motors 2a and 2b, fixing beams 3a and 3b, work motors 5a and 5b and 6a and 6b, and load elements 7a and 7b and 8a and 8b is shown in axonometric projection in FIG. 2, and in plane projection in FIG. 3a , FIG. 3b and FIG. 3c.

The O1 and O2 axes, which are the axes around which the fixing beams rotate, are parallel to the Z axis of the coordinate system, the O3 axis, which is the axis of symmetry for the device, is parallel to the X axis of the coordinate system, and the O4 axis, which is the location of the starting position for the device, is parallel to the Y axis of the coordinate system.

In FIG. 4, the device according to the invention has further illustrated centres of gravity M1a and M1b and M2a and M2b common for the work motors and load elements, which are located at the ends of the radius vectors B1a and B1b and B2a and B2b, respectively, which are attached at the pivot points P1a and P1b and P2a and P2b respectively to the arms B1 and B2 respectively bearing the forces arising from their rotation about the axes O1 and O2 respectively at the pivot points P1 and P2respectively, which are connected to each other by a segment B lying on the axis O4 and along which the forces arising at these points and acting parallel to the axis O4 cancel each other out. As arms B1 and B2 rotate about the axes O1 and O2 respectively, there will be a resultant force attached to segment B at mid-length and acting along the axis O3 perpendicular to it and passing through its centre.

The movement of the device according to the invention occurs as a result of the resultant force arising inside the device. Figures from FIG. 7 to FIG. 14 show the dependence of the direction of the F1 force on the position of the B1 and B2 arms during their full rotation about the O1 and O2 axes.

In FIG. 5 in axonometric projection and FIG. 6 in overhead projection, the device is in a rest start position represented by a symbolic arrangement of centres of gravity M1a and M1b and M2a and M2b located at the ends of the radius vectors B1a and B1b and B2a and B2b respectively, fixed at the pivot points P1a and P1b and P2a and P2b respectively located at the ends of the arms B1 and B2 respectively, which are connected to each other at the pivot points P1 and P2 respectively by a segment B. The corresponding right angles are also indicated in both figures.

Parallel to the Y-axis of the coordinate system, the O4-axis is the designation of the rest start position of the device, with the B segment lying on the O4-axis . The O4 axis is perpendicular to the O3 axis along which the movement of the device takes place. The arms B1 and B2 are parallel to the axis O4, and attached to them at points P1a and P1b and P2a and P2b the radius vectors B1a and B1b and B2a and B2b respectively are perpendicular to the respective arms B1 and B2. The radius vectors B1a and B2a are parallel to the Z axis of the coordinate system, and the radius vectors B1b and B2b are parallel to the O3 axis and the X axis of the coordinate system. It is essential that the position and orientation of radius vector B1a with centre M1a is a mirror image of the position and orientation of radius vector B2a and centre of gravity M2a relative to the O3 axis, and the position and orientation of radius vector B1b with centre M1b is a mirror image of the position and orientation of radius vector B2b and centre of gravity M2b relative to the O3 axis.

The following figures FIG. 7 and FIG. 8, FIG. 9 and FIG. 10, FIG. 11 and FIG. 12 and FIG. 13 and FIG. 14 show two situations illustrating the direction and orientation of the resultant force F1 during full rotation of arms B1 and B2 around the axis of rotation O1 and O2 in the opposite directions R1 and R2 respectively.

The B1 and B2 arms rotate simultaneously at substantially the same speed at points P1 and P2 , respectively, about the O1 and O2 axes, with the B1 arm rotating in line with the R1 arrow orientation and the B2 arm rotating in line with the R2 arrow orientation. Arm B1 must rotate oppositely to arm B2 so that the forces acting along segment B parallel to the O4 axis and the Y axis of the coordinate system cancel each other out.

In FIG. 7 the device in axonometric projection and in FIG. 8 in an overhead projection is shown in the same position during simultaneous rotation of the B1 and B2 arms. During the rotation of arm B1 , point P1 a moves along circle C1 between points P3a and P3b towards point P3b, and point P1b moves along circle C1 between points P3b and P3a towards point P3a. During the rotation of arm B2, point P2a moves along circle C2 between points P4a and P4b towards point P4b, and point P2b moves along circle C2 between points P4b and P4a towards point P4a. In this phase of movement, the resultant force F1 , anchored at point P5 , is directed towards increasing values on the X axis of the coordinate system, under its influence the momentum changes, the device moves and is displaced in accordance with the direction, orientation and conventional magnitude of the vector W1 relative to the starting position lying on the O4 axis.

During rotation, as soon as the position of the B1 arm coincides with the O5 chord and the position of the B2 arm coincides with the O6 chord, the F1 force disappears and the movement of the device stops. Later in the rotation, after the chord O5 is crossed by arm B1 and the chord O6 by arm B2 , the force F1 reappears.

In FIG. 9 in axonometric projection and FIG. 10 in an overhead projection, and in FIG. 11 in axonometric projection and FIG. 12 in an overhead projection, the device is still shown during simultaneous rotation of the arms B1 and B2. During the rotation of arm B1 , point P1 a moves along circle C1 between points P3b and P3a towards point P3a, and point P1b moves along circle C1 between points P3a and P3b towards point P3b. During the rotation of arm B2 , point P2a moves along circle C2 between points P4b and P4a towards point P4a, and point P2b moves along circle C2 between points P4a and P4b towards point P4b. In this phase of the movement, the resultant force F1 is directed towards decreasing values on the X axis of the coordinate system, under its influence the momentum changes, the movement of the device takes place and it is displaced according to the direction, orientation and conventional magnitude of the vector W2 in relation to the starting position lying on the O4 axis.

When chord O5 is again crossed during rotation by arm B1 , and chord O6 by arm B2, the force F1 and the conventional displacement vector W1 change, as in FIG. 13 and FIG. 14.

After the arms B1 and B2 have rotated 360 degrees, the device is again in the starting position, and all elements will be in the same positions and in the same location as in the rest start position of FIGS. 5 and 6.

The displacement of the device shown in the previous figures FIG. 5 and FIG. 6, FIG. 7 and FIG. 8, FIG. 9 and FIG. 10, FIG. 11 and FIG. 12, and FIG. 13 and FIG. 14 is used in the two diagrams of setting and rotation of the load elements shown as centres of gravity, presented further on.

Both diagrams consist of the same stages, but differ in the starting position of the device and the end position of the device reached.

I. The first rotation diagram consists of successive stages:
I.1. start rest position as shown in FIGS. 15 and 16
I.2. simultaneous rotation of the base motors by substantially 180° as represented by the rotation of arms B1 and B2 in Figures FIG. 17 and FIG. 18, FIG. 19 and FIG. 20, and FIG. 21 and FIG. 22

1.3. central rest position shown in FIGS. 23 and 24

1.4. simultaneous rotation of the working motors by substantially 90°, represented as rotations of the radius vectors B1*a* and B1*b* and B2*a* and B2*b* in FIGS. 25 and FIG. 26 and FIG. 27 and FIG. 28

1.5. end rest position as shown in FIGS. 29 and 30

Re I.1. Start Rest Position.

FIG. 15 for the axonometric view and FIG. 16 for the overhead projection show the start rest position of the device in the symbolic form of a system of common centres of gravity M1*a* and M1*b* and M2*a* and M2*b* of the working motors and the load elements attached to them, being at the ends of radius vectors B1*a* and B1*b* and B2*a* and B2*b* respectively attached at pivot points to P1*a* and P1*b* and P2*a* and P2*b* respectively to the arms B1 and B2, which are connected at the pivot points P1 and P2 respectively by a segment B lying on the axis O4.

In the start rest position of the first diagram, the B1 and B2 arms are parallel to the O3 axis and to the X axis of the coordinate system, the B1*a* and B2*a* radius vectors are parallel to the Z axis of the coordinate system, the B1*b* and B2*b* radius vectors are parallel to the O4 axis and the Y axis of the coordinate system, and the B segment is perpendicular to the O3 axis and lies on the O4 axis.

Re. I.2. Simultaneous Rotation of the Base Motors by 180°.

In FIG. 17 and FIG. 18, FIG. 19 and FIG. 20, and FIG. 21 and FIG. 22, the device is shown in axonometric and overhead projections in successive phases of simultaneous rotation of the base motors by substantially 180° presented as rotation of arms B1 and B2 at pivot points P1 and P2, respectively, about axes O1 and O2, in directions R1 and R2, respectively.

In FIGS. 17 and 18, in the initial phase of rotation of arms B1 and B2, point P1*a* moves towards point P3*b*, point P1*b* moves towards point P3*a*, point P2*a* moves towards point P4*b*, point P2*b* moves towards point P4*a*, which results in the appearance of the F1 force, anchored at P5, with its orientation directed according to the increasing X values of the coordinate system, a change of momentum, the movement of the device along the O3 axis, and its displacement by the conventional vector W3 from the start rest position.

In FIG. 19 and FIG. 20, in the middle phase of rotation of the B1 and B2 arms, point P1*a* moves towards point P3*a*, point P1*b* moves towards point P3*b*, point P2*a* moves towards point P4*a*, point P2*b* moves towards point P4*b*, which results in the appearance of the F1 force, anchored at P5, with its orientation directed according to decreasing values of X of the coordinate system, change of momentum, movement of the device along the O3 axis, and its displacement by the conventional vector W4 from the previous position to the position on the O4 axis.

In FIGS. 21 and 22, in the final phase of rotation of arms B1 and B2, point P1*a* continues to move towards point P3*a*, point P1 b continues to move towards point P3*b*, point P2*a* continues to move towards point P4*a*, point P2*b* continues to move towards point P4*b*, which causes the further action of the force F1 attached at point P5, with its orientation directed according to decreasing values of X of the coordinate system, further movement of the device along the axis O3, and its displacement by the conventional vector W5 relative to the position on the axis O4.

Re. I.3. Central Rest Position.

FIG. 23 in axonometric projection and FIG. 24 in overhead projection shows the central rest position obtained after rotating the base motors by an angle of 180°. In the central rest position, the B1 and B2 arms are parallel to the O3 axis and the X axis of the coordinate system, the B1*b* and B2*b* radius vectors are parallel to the O4 axis and the Y axis of the coordinate system, the B1*a* and B2*a* radius vectors are parallel to the Z axis of the coordinate system.

Re. I.4. Simultaneous Rotation of the Working Motors by 90°.

In the following figures FIG. 25 and FIG. 26, as well as FIG. 27 and FIG. 28, the device is shown in axonometric and overhead projections in successive phases of simultaneous rotation of the working motors by essentially 90° presented as rotations of the radius vectors B1*a* and B1*b* and B2*a* and B2*b* at the pivot points P1*a* and P1*b* and P2*a* and P2*b* respectively around the axes O7 and O8, in the directions R3 and R4 respectively.

In FIG. 25 and FIG. 26, in the initial phase of rotation of the radius vectors B1*a* and B1*b* and B2*a* and B2*b*, together with the centres of gravity M1*a* and M1*b* and M2*a* and M2*b* respectively, resultant forces F2 and F3, which are equal in direction and value but opposite in orientation, are trapped in the points P1 and P2. The forces F2 and F3 balance each other and do not move the device.

In FIG. 27 and FIG. 28, in the final phase of rotation of the radius vectors B1*a* and B1*b* and B2*a* and B2*b*, the mutually balancing forces F2 and F3 continue to act without displacing the device.

Re. I.5. End Rest Position.

FIG. 29, axonometric projection, and FIG. 30, overhead projection, show the end rest position of the device after cessation of the working motors. The device has assumed a position that coincides with the start position, but its location is displaced by segment K1 relative to the O4 axis, and there is a change in the placement of the radius vectors: radius vectors B1*a* and B2*a* are parallel to the Y axis of the coordinate system, and radius vectors B1*b* and B2*b* are parallel to the Z axis of the coordinate system.

Since all the load elements are substantially identical, all the working motors are substantially identical, all the base motors are substantially identical, and all the mounting elements are substantially identical, the arrangement of the elements in the end rest position shown in FIG. 29 and FIG. 30 is substantially identical to the arrangement of the elements in the start rest position shown in FIG. 15 and FIG. 16.

II. The second rotation diagram consists of successive stages:

II.1. start rest position as shown in FIGS. 31 and 32

II.2. simultaneous rotation of the base motors by substantially 180° as represented by the rotation of arms B1 and B2 in FIG. 33 and FIG. 34, FIG. 35 and FIG. 36, and FIG. 37 and FIG. 38

II.3. central rest position shown in FIGS. 39 and 40

II.4. simultaneous rotation of the working motors by substantially 90°, as represented by the rotation of the radius vectors B1*a* and B1*b* and B2*a* and B2*b* in FIG. 41 and FIG. 42 and FIG. 43 and FIG. 44

II.5. end rest position as shown in FIG. 45 and FIG. 46.

Re. II.1. Start Rest Position.

FIG. 31 for the axonometric projection and FIG. 32 for the overhead projection show the start rest position of the device in the symbolic form of a system of common centres of gravity M1*a* and M1*b* and M2*a* and M2*b* of the working motors and the load elements attached to them, which are at the ends of radius vectors B1*a* and B1*b* and B2*a* and B2*b*, attached at pivot points to P1*a* and P1*b* and P2*a* and P2*b* respectively to the arms B1 and B2, which are connected at their pivot points P1 and P2 respectively by a segment B lying on the axis O4.

In the start rest position of the second diagram, the B1 and B2 arms lie on the O4 axis and are parallel to the Y axis of the coordinate system, the B1a and B2a radius vectors are parallel to the Z axis of the coordinate system, and the B1b and B2b radius vectors are parallel to the O3 axis and to the X axis of the coordinate system.

Re. II.2. Simultaneous Rotation of the Base Motors by 180°.

In the following figures FIG. 33 and FIG. 34, FIG. 35 and FIG. 36, and FIG. 37 and FIG. 38, the device is shown in axonometric projections and overhead projections in successive phases of simultaneous rotation of the base motors presented as rotation of the arms B1 and B2 at the pivot points P1 and P2, respectively, around the axes O1 and O2, in the directions R1 and R2, respectively.

In FIGS. 33 and 34, in the initial phase of rotation of arms B1 and B2, point P1a moves towards point P3b, point P1b moves towards point P3a, point P2a moves towards point P4b, point P2b moves towards point P4a, which results in the appearance of the F1 force, anchored at P5, with its orientation directed according to the increasing X values of the coordinate system, a change of momentum, the movement of the device along the O3 axis, and its displacement by the conventional vector W6 from the start rest position.

In FIGS. 35 and 36, in the middle phase of rotation of arms B1 and B2, point P1a continues to move towards point P3b, point P1b continues to move towards point P3a, point P2a continues to move towards point P4b, point P2b continues to move towards point P4a, which results in the further action of the F1 force, anchored at P5, with its orientation directed according to the increasing X values of the coordinate system, the further movement of the device along the O3 axis, and its greater displacement from the start rest position by the conventional vector W7.

In FIG. 37 and FIG. 38, in the final phase of rotation of the B1 and B2 arms, point P1a moves towards point P3a, point P1b moves towards point P3b, point P2a moves towards point P4a, point P2b moves towards point P4b, which results in the appearance of the F1 force, anchored at P5, with its orientation directed according to decreasing values of X of the coordinate system, change of momentum, movement of the device along the O3 axis, and its displacement by the conventional vector W8 from the previous position towards the O4 axis.

Re. II.3. Central Rest Position.

FIG. 39 in axonometric projection and FIG. 40 in overhead projection shows the central rest position obtained after rotating the base motors by an angle of 180° starting from the start rest position. In the central rest position, the B1 and B2 arms are parallel to the O4 axis and to the Y axis of the coordinate system, the B1a and B2a radius vectors are parallel to the Z axis of the coordinate system, and the B1b and B2b radius vectors are parallel to the O3 axis and to the X axis of the coordinate system.

Re. II.4. Simultaneous Rotation of the Working Motors by 90°.

In the following figures FIGS. 41 and 42 as well as FIG. 43 and FIG. 44, the device is shown in axonometric and overhead projections in successive phases of simultaneous rotation of the working motors presented as rotation of the radius vectors B1a and B1b and B2a and B2b at the pivot points P1a and P1b and P2a and P2b respectively around the axis O9 in the direction R4.

In FIG. 41 and FIG. 42, in the initial phase of rotation of the radius vectors B1a and B1b and B2a and B2b, together with the centres of gravity M1a and M1b and M2a and M2b respectively, cause the appearance of a force F4 fixed at point P5 with a direction according to decreasing values of X of the coordinate system, a change of momentum, movement of the device along the axis O3, and its displacement by the conventional vector W9 relative to the central rest position.

In FIG. 43 and FIG. 44, in the final phase of rotation of the radius vectors B1a and B1b, and B2a and B2b, the force F5 with orientation directed according to the decreasing values of X of the coordinate system continues to act, causing further movement of the device along the axis O3, and its displacement under the influence of the force F4 by the conventional vector W10 relative to the central rest position, significantly moving the device away from the axis O4.

Re. II.5. End Rest Position.

FIG. 45, axonometric projection, and FIG. 46, overhead projection, show the end rest position of the device after cessation of the working motors. The device has assumed a position that coincides with the start position, but its location is displaced by segment K2 relative to the O4 axis, and there is a change in the placement of the radius vectors: radius vectors B1a and B2a are parallel to the X axis of the coordinate system, and radius vectors B1b and B2b are parallel to the Z axis of the coordinate system.

Since all the load elements are substantially identical, all the working motors are substantially identical, all the base motors are substantially identical, and all the mounting elements are substantially identical, the arrangement of the elements in the end rest position shown in FIG. 45 and FIG. 46 is substantially identical to the arrangement of the elements in the start rest position shown in FIG. 31 and FIG. 32.

Once the end rest position has been reached according to the first or second diagram, a further sequence of rotation of the motors according to the previously adopted first or second diagram may be carried out to obtain a further permanent displacement of the device relative to its current position. An additional feature increasing the functionality of the device can be the use of suitably prepared, in terms of dimensions and other parameters, electrical energy accumulators as load elements, being at the same time the source of current for the base and working motors.

The invention claimed is:

1. A vehicle propulsion unit, characterised in that the unit comprises at least two modules connected by a frame (1), where each module comprises four work motors (5a), (5b) and (6a), (6b) mounted on fixing beams (3a) and (3b) provided with primary controllers (9a), (9b) and (10a), (10b) at the ends of which load elements (7a), (7b) and (8a), (8b) are placed, wherein the load elements have a mass of more than 1% of the mass of the module, wherein each module further comprises two base motors (2a) and (2b) provided with secondary controllers (4a) and (4b) and a power source (11) of at least 5 V and an electronic system (12) for controlling rotation and sequence of starting of the two base motors (2a) and (2b) and the four work motors (5a), (5b) and (6a), (6b).

2. The vehicle propulsion unit according to claim 1, characterised in that the base motors (2a) and (2b) are electric motors.

3. The vehicle propulsion unit according to claim 1, characterised in that the base motors (2a) and (2b) are servo motors.

4. The vehicle propulsion unit according to claim 1, characterised in that the work motors (5a), (5b), (6a), (6b) are electric motors.

5. The vehicle propulsion unit according to claim 1, characterised in that the work motors (5a), (5b), (6a), (6b) are servo motors.

6. The vehicle propulsion unit according to claim 1, characterised in that the power source (11) is a direct current source.

7. The vehicle propulsion unit according to claim 1, characterised in that the power source (11) is an alternating current source.

8. The vehicle propulsion unit according to claim 1, characterised in that the base motors (2a) and (2b) have a power not less than 1 mW.

9. The vehicle propulsion unit according to claim 1, characterised in that the work motors (5a), (5b) and (6a), (6b) have a power not less than 1 mW.

10. The vehicle propulsion unit according to claim 1, characterised in that the primary controllers (9a), (9b) and (10a), (10b) communicate with the electronic system (12) by wireless transmission.

11. The vehicle propulsion unit according to claim 1, characterised in that the secondary controllers (4a) and (4b) communicate with the electronic system (12) by wireless transmission.

12. The vehicle propulsion unit according to claim 1, characterised in that the primary controllers (9a), (9b) and (10a), (10b) and the secondary controllers (4a) and (4b) communicate with the electronic system (12) by wire transmission.

13. The vehicle propulsion unit according to claim 1, characterised in that the primary controllers (9a), (9b) and (10a), (10b) and the secondary controllers (4a) and (4b) communicate with the electronic system (12) by means of a mixed transmission, partly wireless and partly wired.

14. The vehicle propulsion unit according to claim 1, characterised in that the load elements (7a), (7b) and (8a), (8b) have substantially equal masses.

15. The vehicle propulsion unit according to claim 1, characterised in that the load elements (7a), (7b) and (8a), (8b) are made of metal.

16. The vehicle propulsion unit according to claim 1, characterised in that the load elements (7a), (7b) and (8a), (8b) are made of plastic.

17. The vehicle propulsion unit according to claim 1, characterised in that the load elements (7a), (7b) and (8a), (8b) are made of minerals or preparations thereof.

18. The vehicle propulsion unit according to claim 1, characterised in that the load elements (7a), (7b) and (8a), (8b) are made of liquid or gel.

19. The vehicle propulsion unit according to claim 1, characterised in that the work motors (5a), (5b), (6a), (6b) fulfil the role of the load elements (7a), (7b) and (8a), (8b).

20. The vehicle propulsion unit according to claim 1, characterised in that the load elements (7a), (7b) and (8a), (8b) are accumulators of electrical energy supplying the work motors (5a), (5b), (6a), (6b).

21. The vehicle propulsion unit according to claim 1, characterised in that the base motors (2a) and (2b) have substantially the same technical characteristics.

22. The vehicle propulsion unit according to claim 1, characterised in that the work motors (5a), (5b) and (6a), (6b) have substantially the same technical characteristics.

* * * * *